(12) United States Patent
Yerramalli et al.

(10) Patent No.: US 10,349,293 B2
(45) Date of Patent: Jul. 9, 2019

(54) CONTROL OF UE CLEAR CHANNEL ASSESSMENT BY AN ENB

(71) Applicant: QUALCOMM Incorporated, San Diego, CA (US)

(72) Inventors: Srinivas Yerramalli, San Diego, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 15/098,128

(22) Filed: Apr. 13, 2016

(65) Prior Publication Data
US 2016/0309354 A1 Oct. 20, 2016

Related U.S. Application Data

(60) Provisional application No. 62/149,377, filed on Apr. 17, 2015.

(51) Int. Cl.
*H04W 24/08* (2009.01)
*H04W 76/27* (2018.01)
(Continued)

(52) U.S. Cl.
CPC ........... *H04W 24/08* (2013.01); *H04W 24/02* (2013.01); *H04W 72/0446* (2013.01);
(Continued)

(58) Field of Classification Search
CPC . H04W 16/14; H04W 74/0808; H04W 72/14; H04W 74/0816; H04W 24/08;
(Continued)

(56) References Cited

U.S. PATENT DOCUMENTS 9,774,429 B2* 9/2017 Patel ................... H04L 27/0006
9,986,586 B2* 5/2018 Lee ...................... H04W 74/004
(Continued)

FOREIGN PATENT DOCUMENTS

WO 2014071308 A1 5/2014
WO 2015038930 A1 3/2015

OTHER PUBLICATIONS

International Search Report and Written Opinion—PCT/US2016/027604—ISA/EPO—dated Jun. 29, 2016.
(Continued)

*Primary Examiner* — Will W Lin
(74) *Attorney, Agent, or Firm* — Nerrie M. Zohn

(57) ABSTRACT

A method, an apparatus, and a computer program product for wireless communication are provided. An eNB determines a CCA parameter for use by a UE in performing a CCA procedure for UL transmission and transmits an indication of the CCA parameter to the UE. The UE receives an indication of the CCA parameter for UL transmission from the eNB and performs the CCA procedure for UL transmission using the indicated CCA parameter. The UE may transmit to the eNB prior to receiving the indication of the CCA parameter. The eNB may use the report in determining the CCA parameter for use by the UE.

56 Claims, 14 Drawing Sheets

(51) Int. Cl.
*H04W 72/04* (2009.01)
*H04W 72/08* (2009.01)
*H04W 72/14* (2009.01)
*H04W 74/08* (2009.01)
*H04W 24/02* (2009.01)
*H04W 74/00* (2009.01)
*H04W 84/12* (2009.01)
*H04W 88/02* (2009.01)
*H04W 16/14* (2009.01)

(52) U.S. Cl.
CPC ..... *H04W 72/0473* (2013.01); *H04W 72/085* (2013.01); *H04W 72/14* (2013.01); *H04W 74/0808* (2013.01); *H04W 76/27* (2018.02); *H04W 16/14* (2013.01); *H04W 72/042* (2013.01); *H04W 74/006* (2013.01); *H04W 84/12* (2013.01); *H04W 88/02* (2013.01)

(58) Field of Classification Search
CPC . H04W 24/02; H04W 76/27; H04W 72/0473; H04W 72/085; H04W 72/0446; H04W 88/02; H04W 72/042; H04W 84/12; H04W 74/006
See application file for complete search history.

(56) References Cited

U.S. PATENT DOCUMENTS

| | | | | |
|---|---|---|---|---|
| 2002/0188723 | A1* | 12/2002 | Choi | H04W 36/06 709/225 |
| 2005/0152313 | A1* | 7/2005 | Cave | H04W 74/08 370/333 |
| 2006/0018284 | A1 | 1/2006 | Rudolf et al. | |
| 2012/0230310 | A1 | 9/2012 | Roy et al. | |
| 2015/0099525 | A1 | 4/2015 | Ji et al. | |
| 2016/0081010 | A1* | 3/2016 | Seok | H04W 74/0816 370/329 |
| 2016/0119846 | A1* | 4/2016 | Chou | H04W 36/22 370/331 |
| 2016/0174254 | A1* | 6/2016 | Hedayat | H04W 74/006 370/329 |
| 2016/0286579 | A1* | 9/2016 | Park | H04L 5/0048 |
| 2016/0302231 | A1* | 10/2016 | Chien | H04W 74/0816 |
| 2016/0309512 | A1* | 10/2016 | Li | H04W 74/0816 |
| 2017/0118771 | A1* | 4/2017 | Kazmi | H04W 16/14 |
| 2017/0127429 | A1* | 5/2017 | Coffey | H04L 1/0021 |
| 2017/0181189 | A1* | 6/2017 | Luo | H04W 74/08 |
| 2017/0230986 | A1* | 8/2017 | Moon | H04W 74/08 |
| 2018/0049243 | A1* | 2/2018 | Lee | H04W 74/0833 |
| 2018/0115991 | A1* | 4/2018 | Yang | H04W 72/14 |
| 2018/0249499 | A1* | 8/2018 | Kim | H04W 72/04 |

OTHER PUBLICATIONS

LG Electronics: "Carrier Selection and Other Coexistence Methods", 3GPP Draft, R1-144901 LAA Carrier Selection, 3rd Generation Partnership Project (3GPP), Mobile Competence Centre, 650, Route Des Lucioles, F-06921 Sophia-Antipolis Cedex, France, vol. RAN WG1, No. San Francisco, USA, Nov. 17, 2014-Nov. 21, 2014, Nov. 8, 2014 (Nov. 8, 2014), 7 Pages, XP050885563, Retrieved from the Internet: URL: http://www.3gpp.org/ftp/tsg_ran/WG1_RL1 / TSGR1_79/Docs/, [retrieved on Nov. 8, 2014].

ZTE: "Potential Design for LAA UL Transmission", 3GPP Draft, R1-151719 Potential Design for LAA UL Transmission, 3rd Generation Partnership Project (3GPP), Mobile Competence Centre, 650, Route Des Lucioles, F-06921 Sophia-Antipolis Cedex, France, vol. RAN WG1, No. Belgrade, Serbia, Apr. 20, 2015-Apr. 24, 2015 Apr. 11, 2015 (Apr. 11, 2015), pp. 1-5, XP050950119, Retrieved from the Internet: URL: http://www.3gpp.org/ftp/tsg_ran/WG1_RL1/TSGR1_80b/Docs/, [retrieved on Apr. 11, 2015].

\* cited by examiner

CONTROL OF UE CLEAR CHANNEL ASSESSMENT BY AN ENB

CROSS-REFERENCE TO RELATED APPLICATION

This application claims the benefit of U.S. Provisional Application Ser. No. 62/149,377, entitled "CONTROL OF UE CLEAR CHANNEL ASSESSMENT BY AN ENB" and filed on Apr. 17, 2015, which is expressly incorporated by reference herein in its entirety.

BACKGROUND

Field

Aspects of the present disclosure relate generally to wireless communication systems, and more particularly, to control of the user equipment (UE) clear channel assessment (CCA) procedure for uplink (UL) transmissions by an eNodeB (eNB).

Background

Wireless communication systems are widely deployed to provide various types of communication content, such as voice, video, packet data, messaging, broadcast, or the like. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as UEs. A base station may communicate with UEs on downlink channels (e.g., for transmissions from a base station to a UE) and uplink channels (e.g., for transmissions from a UE to a base station).

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a CCA procedure to determine whether a channel of the contention-based shared radio frequency spectrum band is available. When it is determined that the channel of the contention-based shared radio frequency spectrum band is available, a channel reserving signal, such as a channel usage beacon signal (CUBS) may be transmitted to reserve the channel.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In Long Term Evolution in the unlicensed spectrum (LTE-U), both the eNB and the UE perform CCA operations in order to access a channel. For DL transmissions, an eNB must capture the medium by performing a CCA before transmitting. Likewise, a UE must perform a CCA procedure in order to transmit UL data. At times, the UE may be required to wait to perform the CCA operation until it receives a UL grant from the eNB. At other times, the UE may contend for the channel by performing a CCA without receiving an UL grant. Regardless of whether the UE waits for an UL grant or not, the UE performs CCA autonomously from the eNB. The eNB and UE may use different access procedures and listen-before-talk (LBT) mechanisms and may experience different interference conditions. As the UE needs to perform CCA in order to transmit UL data, an unsuccessful CCA forces the UE to delay the UL transmission.

As presented herein, an eNB may use its knowledge of potential traffic, interference, CCA clearance statistics, etc. in order to guide the UE in performing a CCA operation. This may reduce a delay caused to the UE by failed CCAs by increasing the likelihood that the UE will perform a successful CCA.

Various aspects presented herein provide for mechanisms by which an eNB may control parameters of the UE channel access procedure. The eNB receives information regarding wireless communication on one or more Radio Access Technologies (RAT), determines at least one CCA parameter for use by a UE in performing a CCA procedure for UL based on the received information and/or observed network traffic, and transmits an indication of at least one CCA parameter to the UE. The information may be received by the eNB as a report from at least one UE, may be the result of observing traffic on the one or more RATs, or may be some combination thereof.

Once the UE receives the CCA parameter(s) from the eNB, it determines whether to use the at least one CCA parameter in performing the CCA procedure for UL transmission. Then, it performs the CCA operation. At times, the UE may determine not to respect at least one of the CCA parameters indicated to it by the eNB. Thus, the UE may respect all CCA parameters indicated by the eNB, some of the CCA parameters indicated by the eNB or none of the CCA parameters indicated by the eNB. The closed loop control of the CCA procedure by the eNB provides for greater efficiencies in the CCA procedure by the UE. The eNB may determine CCA parameters for use by the UE, or may provide recommendations for CCA parameters, based on its own knowledge and/or the eNB may use information provided by the UE in order to determine the CCA parameters for the UE.

In an aspect of the disclosure, a method, a computer program product, and an apparatus are provided. The apparatus receives information regarding wireless communication on one or more Radio Access Technologies (RAT), determines at least one CCA parameter for use by a UE in performing a CCA procedure for UL communication based on the received information, and transmits an indication of the at least one CCA parameter to the UE. The apparatus may receive a report from the UE. Among others, the report may comprise at least one of a type of Wi-Fi packets received by the UE, an interference measurement report, and CCA clearance statistics. The apparatus may determine the CCA parameter at least in part using the received report.

In another aspect of the disclosure, a method, a computer program product, and an apparatus are provided. The apparatus receives an indication of at least one CCA parameter for use in performing a CCA procedure for UL transmission and determines whether to use the at least one CCA parameter in performing the CCA procedure for UL transmission. The UE then performs the CCA procedure for UL transmission, either using or not using some combination of the indicated CCA parameter(s). The apparatus may transmit a report prior to receiving the indication of the CCA parameter. The report may comprise comprising any of received Wi-Fi packets, an interference measurement report for downlink (DL) transmission, CCA clearance statistics, etc.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
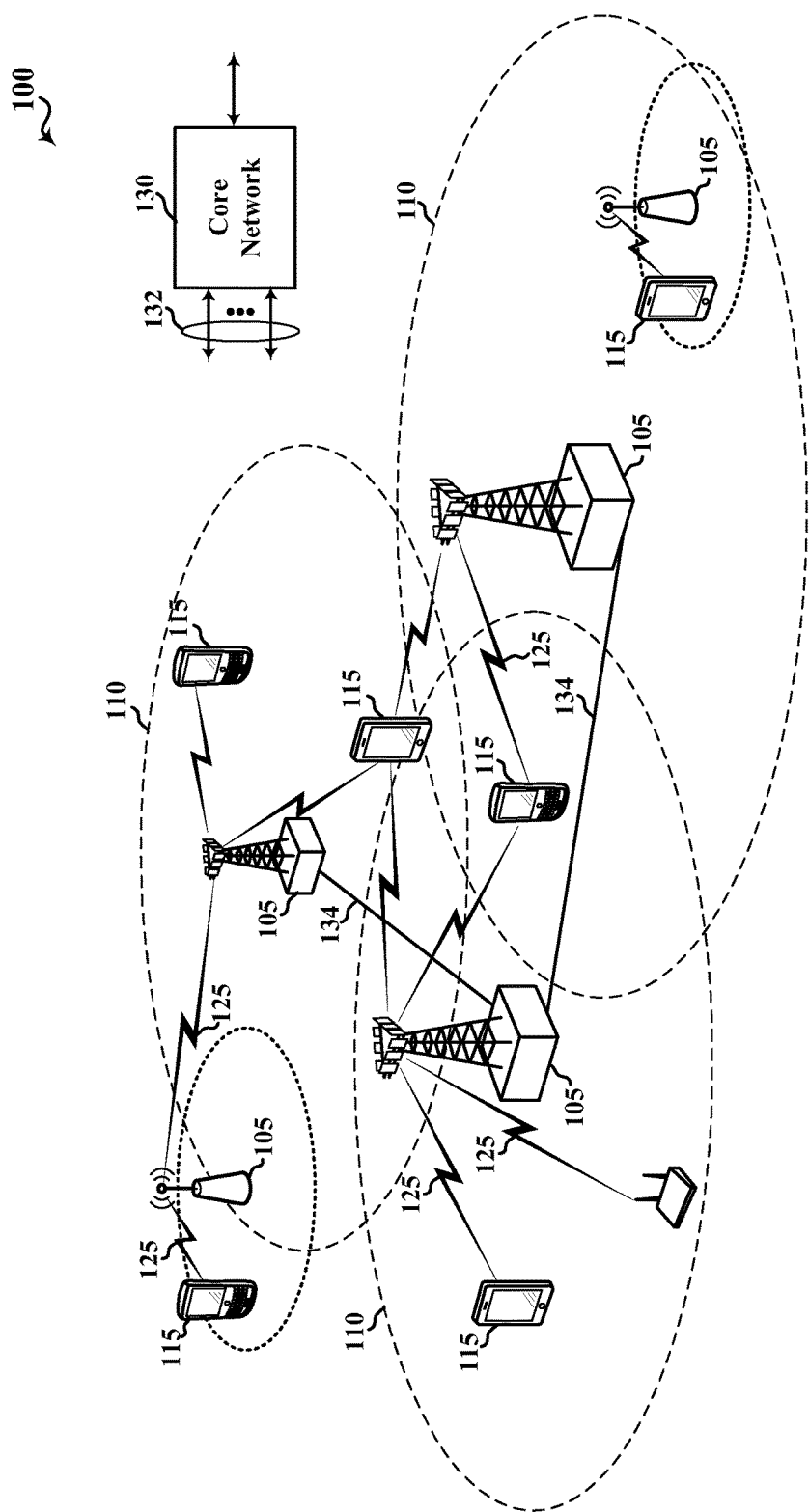
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Techniques are described in which an unlicensed radio frequency spectrum band is used for at least a portion of contention-based communications over a wireless communication system. In some examples, a contention-based shared radio frequency spectrum band may be used for Long Term Evolution (LTE) communications or LTE-Advanced (LTE-A) communications. The contention-based radio frequency spectrum band may be used in combination with, or independent from, a non-contention licensed radio frequency spectrum band. In some examples, the contention-based radio frequency spectrum band may be a radio frequency spectrum band for which a device may also need to contend for access because the radio frequency spectrum band is available, at least in part, for unlicensed use, such as Wi-Fi use.

With increasing data traffic in cellular networks that use a licensed radio frequency spectrum band, offloading of at least some data traffic to a contention-based shared radio frequency spectrum band, such as in an unlicensed band, may provide a cellular operator (e.g., an operator of a public land mobile network (PLMN) or a coordinated set of base stations defining a cellular network, such as an LTE/LTE-A network) with opportunities for enhanced data transmission capacity. As noted above, before communicating over a contention-based shared radio frequency spectrum band, such as unlicensed spectrum, devices may perform an LBT procedure to gain access to the shared radio frequency spectrum band. Such an LBT procedure may include performing a CCA procedure (or an extended CCA procedure) to determine whether a channel of the unlicensed radio frequency spectrum band is available. When it is determined that the channel of the contention-based radio frequency spectrum band is available, a channel reserving signal (e.g., a CUBS) may be transmitted to reserve the channel. When it is determined that a channel is not available, a CCA procedure (or extended CCA procedure) may be performed for the channel again at a later time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 is an illustration of an example wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., 51, etc.) and may perform radio configuration and scheduling for communication with the UEs 115, or may operate under the control of a base station controller (not shown). In various examples, the base stations 105 may communicate, either directly or indirectly (e.g., through core network 130), with other base stations 105 over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions for a network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area than a macro cell, and may allow unrestricted access by UEs with service subscriptions with the network provider. A femto cell also may cover a relatively smaller geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions from a UE 115 to a base station 105. The downlink transmissions may also be called forward link transmissions, while the uplink transmissions may also be called reverse link transmissions. In some examples, UL transmissions may include transmissions of uplink control information, which uplink control information may be transmitted over an uplink control channel (e.g., a physical uplink control channel (PUCCH) or enhanced PUCCH (ePUCCH)). The uplink control information may include, for example, acknowledgements or non-acknowledgements of downlink transmissions, or channel state information. Uplink transmissions may also include transmissions of data, which data may be transmitted over a physical uplink shared channel (PUSCH) or enhanced PUSCH (ePUSCH). Uplink transmissions may also include the transmission of a sounding reference signal (SRS) or enhanced SRS (eSRS), a physical random access channel (PRACH) or enhanced PRACH (ePRACH) (e.g., in a dual connectivity mode or the standalone mode described with reference to FIGS. 2A and 2B), or a scheduling request (SR) or enhanced SR (eSR) (e.g., in the standalone mode described with reference to FIGS. 2A and 2B). References in this disclosure to a PUCCH, a PUSCH, a PRACH, an SRS, or an SR are presumed to inherently include references to a respective ePUCCH, ePUSCH, ePRACH, eSRS, or eSR.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

The wireless communication system 100 may also or alternatively support operation over a non-contention licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) or a contention-based shared radio frequency spectrum band (e.g., an unlicensed radio frequency spectrum band for which transmitting apparatuses may need to contend for access because the radio frequency spectrum band is available for unlicensed use, such as Wi-Fi use). Upon winning a contention for access to the contention-based shared radio frequency spectrum band, a transmitting apparatus (e.g., a base station 105 or UE 115) may transmit one or more channel reserving signals (e.g., one or more CUBS) over the unlicensed radio frequency spectrum band. The channel reserving signals may serve to reserve the unlicensed radio frequency spectrum by providing a detectable energy on the unlicensed radio frequency spectrum band. The channel reserving signals may also serve to identify a transmitting apparatus and/or a transmitting antenna, or may serve to synchronize the transmitting apparatus and a receiving apparatus. In some examples, a channel reserving signal transmission may commence at a symbol period boundary (e.g., an OFDM symbol period boundary). In other examples, a CUBS transmission may commence between symbol period boundaries.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2A:
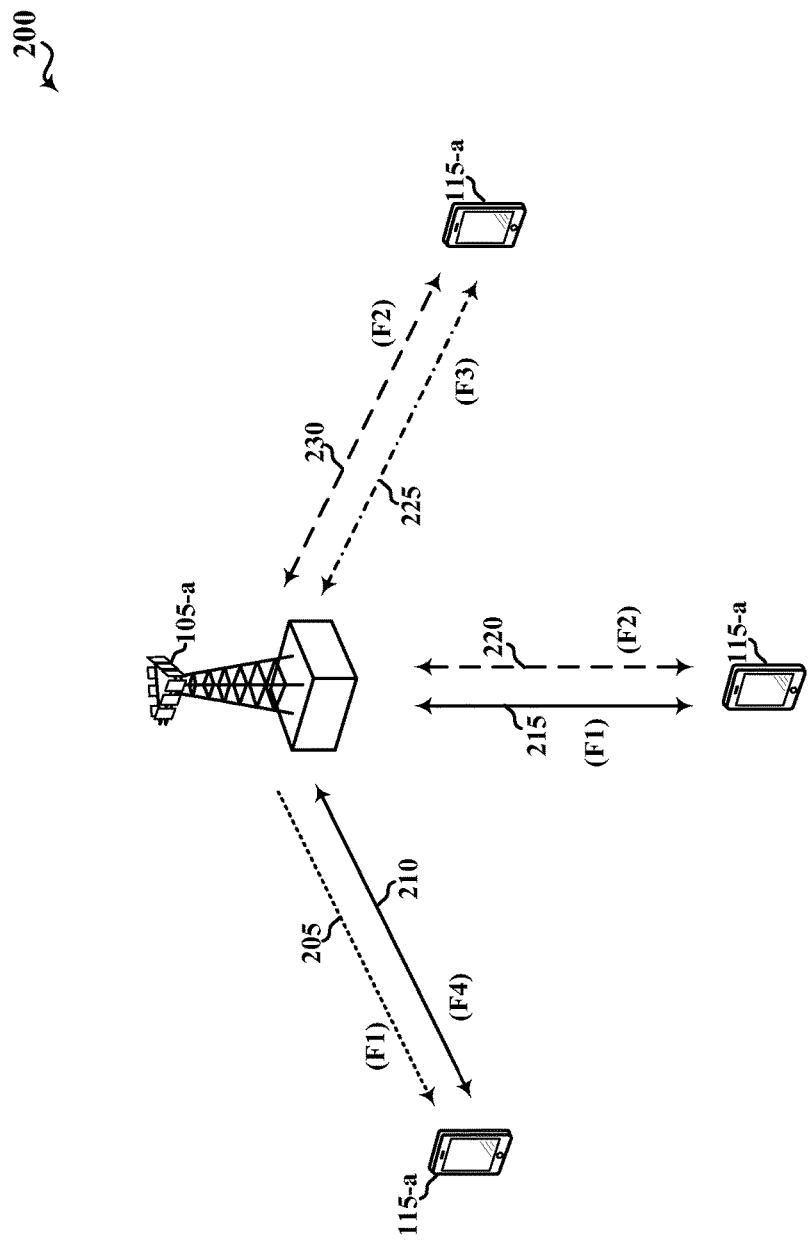
FIG. 2A shows a diagram that illustrates examples of deployment scenarios for using LTE in an unlicensed spectrum according to various embodiments.

Turning next to FIG. 2A, a diagram 200 shows examples of a supplemental downlink mode (e.g., licensed assisted access (LAA) mode) and of a carrier aggregation mode for an LTE network that supports LTE/LTE-A extended to contention-based shared spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode (e.g., LAA mode) in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink (e.g., LAA mode) described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with or without contention-based shared spectrum for capacity offload.

As described above, the typical service provider that may benefit from the capacity offload offered by using LTE/LTE-A extended to contention-based spectrum is a traditional MNO with LTE spectrum. For these service providers, an operational configuration may include a bootstrapped mode (e.g., supplemental downlink (e.g., LAA mode), carrier aggregation) that uses the LTE primary component carrier (PCC) on the non-contention spectrum and the LTE secondary component carrier (SCC) on the contention-based spectrum.

In the supplemental downlink mode, control for LTE/LTE-A extended to contention-based spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in an unlicensed spectrum. There is no need to implement LBT or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A extended to contention-based shared spectrum (e.g., bidirectional links 215 and 225). The carrier aggregation mechanisms supported when using LTE/LTE-A extended to contention-based shared spectrum may fall under a hybrid frequency division duplexing-time division duplexing (FDD-TDD) carrier aggregation or a TDD-TDD carrier aggregation with different symmetry across component carriers.

Figure 2B:
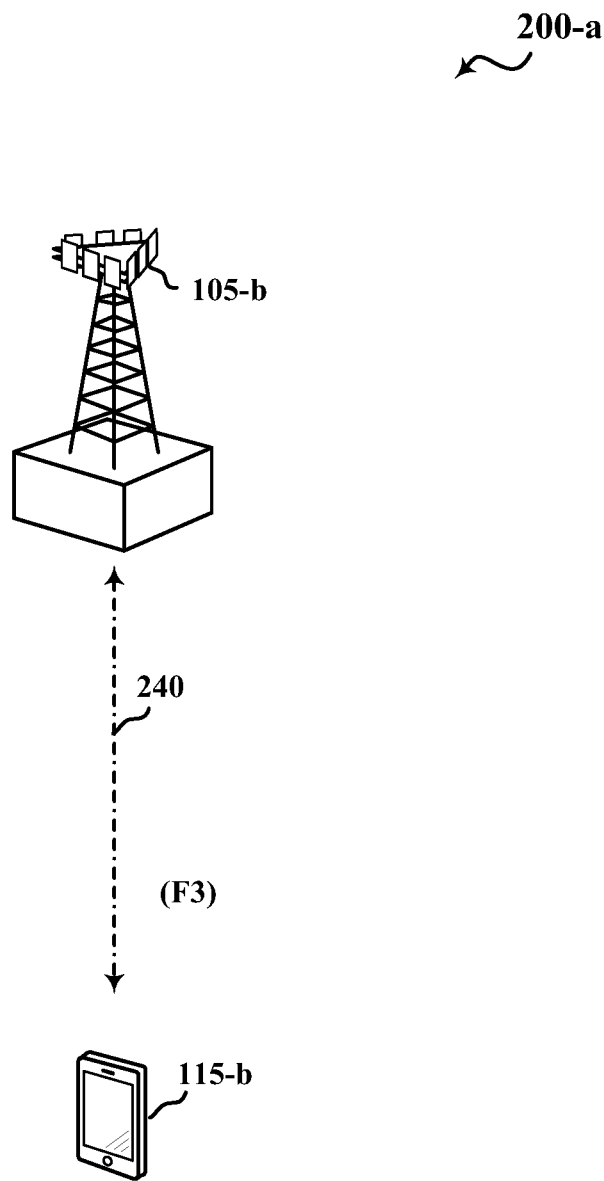
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A extended to contention-based shared spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in a contention-based shared spectrum described above with reference to FIG. 2A. The standalone mode may be used in non-traditional wireless access scenarios, such as in-stadium access (e.g., unicast, multicast). An example of the typical service provider for this mode of operation may be a stadium owner, cable company, event hosts, hotels, enterprises, and large corporations that do not have licensed spectrum. For these service providers, an operational configuration for the standalone mode may use the PCC on the contention-based spectrum. Moreover, LBT may be implemented on both the base station and the UE.

In some examples, a transmitting apparatus such as one of the base stations 105, 205, or 205-a described with reference to FIG. 1, 2A, or 2B, or one of the UEs 115, 215, 215-a, 215-b, or 215-c described with reference to FIG. 1, 2A, or 2B, may use a gating interval to gain access to a channel of a contention-based shared radio frequency spectrum band (e.g., to a physical channel of an unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based at least in part on the LBT protocol specified in European Telecommunications Standards Institute (ETSI). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a contention-based shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the contention-based shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

The number and arrangement of components shown in FIGS. 2A and 2B are provided as an example. In practice, wireless communication system 200 may include additional devices, fewer devices, different devices, or differently arranged devices than those shown in FIGS. 2A and 2B.

Figure 3:
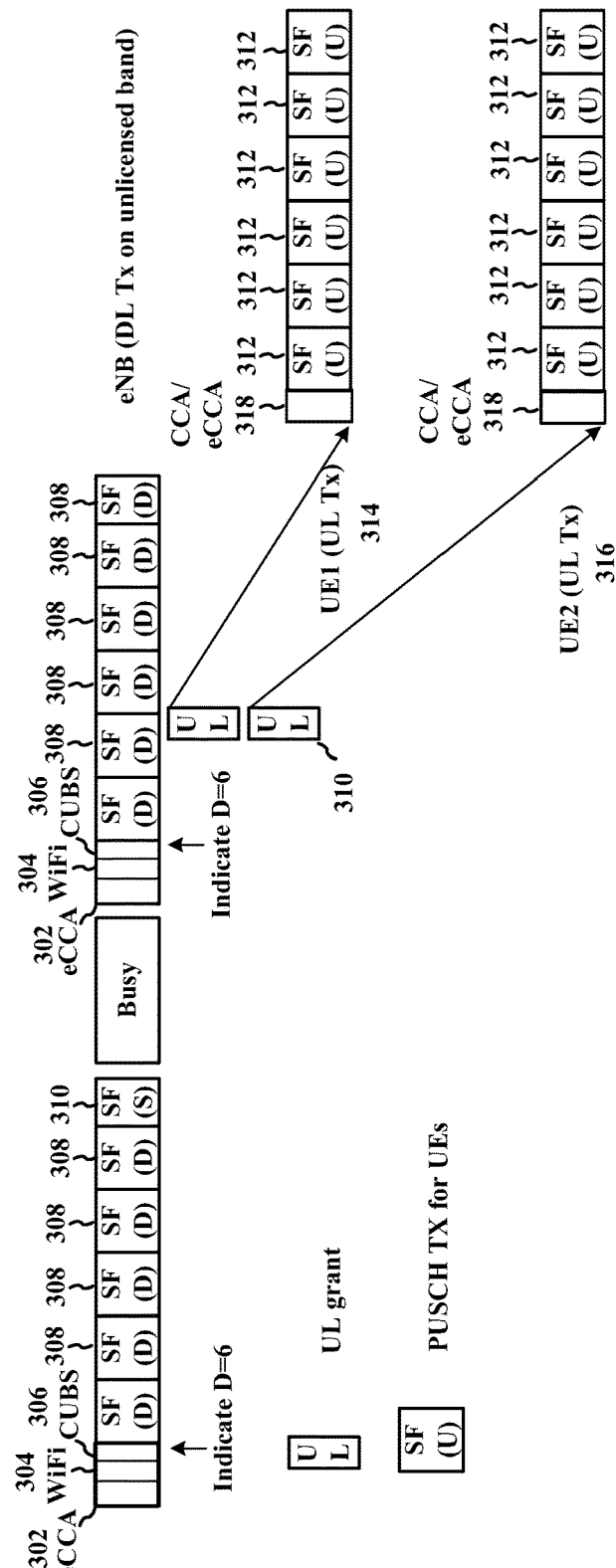
FIG. 3 shows a diagram that illustrates an example of wireless communication using an unlicensed spectrum according to aspects of the present disclosure.

FIG. 3 is an illustration of an example 300 of a wireless communication over an unlicensed radio frequency spectrum band, in accordance with various aspects of the present disclosure. FIG. 3 illustrates a downlink clear channel assessment (CCA) procedure 302 may be performed by one or more base stations, such as one or more of the base stations 105, 205, or 205-a described with reference to FIG. 1 or 2, to reserve, for a period of time, a channel of the contention-based shared radio frequency spectrum band over which the wireless communication occurs. Following a successful downlink CCA procedure 345 by a base station, the base station may transmit a preamble, such as a Wi-Fi preamble 304 and/or channel usage beacon signal (CUBS) 306 (e.g., a downlink CUBS (D-CUBS 350)) to provide an indication to other base stations or apparatuses (e.g., UEs, Wi-Fi access points, etc.) that the base station has reserved the channel.

The eNB may then transmit a number of downlink (D) subframes 308. The eNB may transmit an indication of a number of DL subframes that it will transmit, e.g., in FIG. 3, the an indication is provided by the eNB that it will transmit 6 D subframes. There may also be a special subframe (S) 310, which may be a transition subframe, e.g., between D and U subframes. Some of the D subframes may include a grant 310 to a UE(s) to transmit UL communication during a number of uplink (U) subframes 312. FIG. 3 illustrates UL grants communicated to two different UEs, UE1 314 and UE2 316. UE1 and UE2 may be, e.g., one or more of the UEs 115, 215, 215-a, 215-b, or 215-c described above with reference to FIG. 1, 2A, or 2B. Based on the UL grant 310, UE1 314 and UE2 316 may perform a CCA or extended CCA (ECCA) procedure 318, and when successful transmit a number of UL subframes 312 according to the UL grant 310.

As indicated above, FIG. 3 is provided as an example. Other examples are possible and may differ from what was described in connection with FIG. 3.

Figure 4:
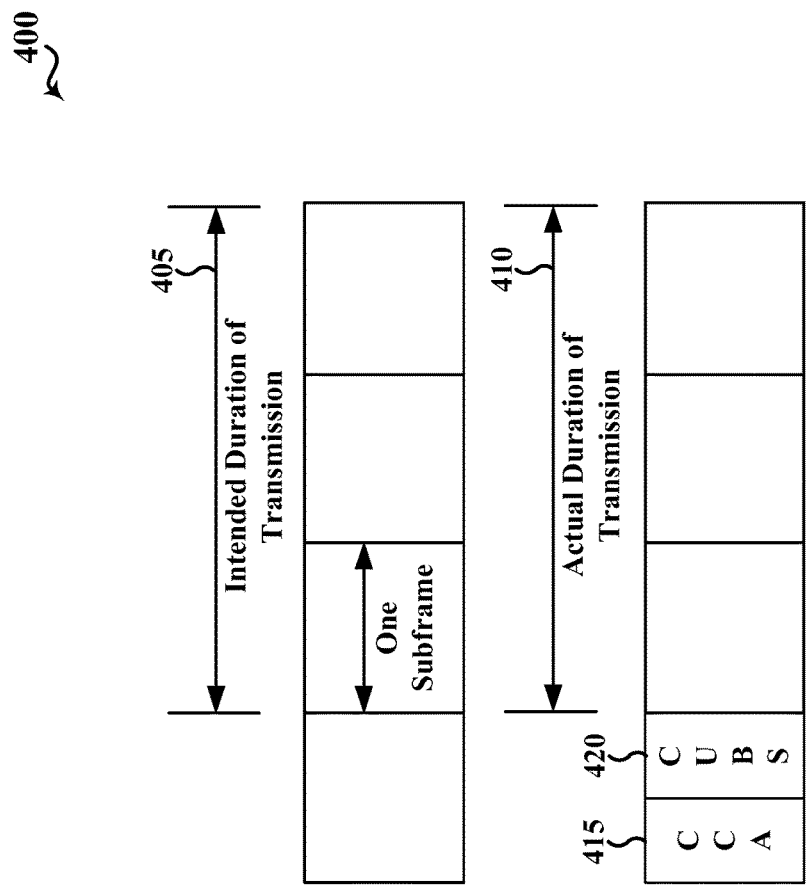
FIG. 4 is a block diagram conceptually illustrating a design of a base station/eNB and a UE configured according to one aspect of the present disclosure.

FIG. 4 is an illustration of an example 400 of a CCA procedure 415 performed by a transmitting apparatus when contending for access to a contention-based shared radio frequency spectrum band, in accordance with various aspects of the present disclosure. In some examples, the CCA procedure 415 may be an example of the downlink CCA procedure 345 or uplink CCA procedure 365 described with reference to FIG. 3. The CCA procedure 415 may have a fixed duration. In some examples, the CCA procedure 415 may be performed in accordance with an LBT-frame based equipment (LBT-FBE) protocol. Following the CCA procedure 415, a channel reserving signal, such as a CUBS 420, may be transmitted, followed by a data transmission (e.g., an uplink transmission or a downlink transmission). By way of example, the data transmission may have an intended duration 405 of three subframes and an actual duration 410 of three subframes.

As indicated above, FIG. 4 is provided as an example. Other examples are possible and may differ from what was described in connection with FIG. 4.

Figure 5:
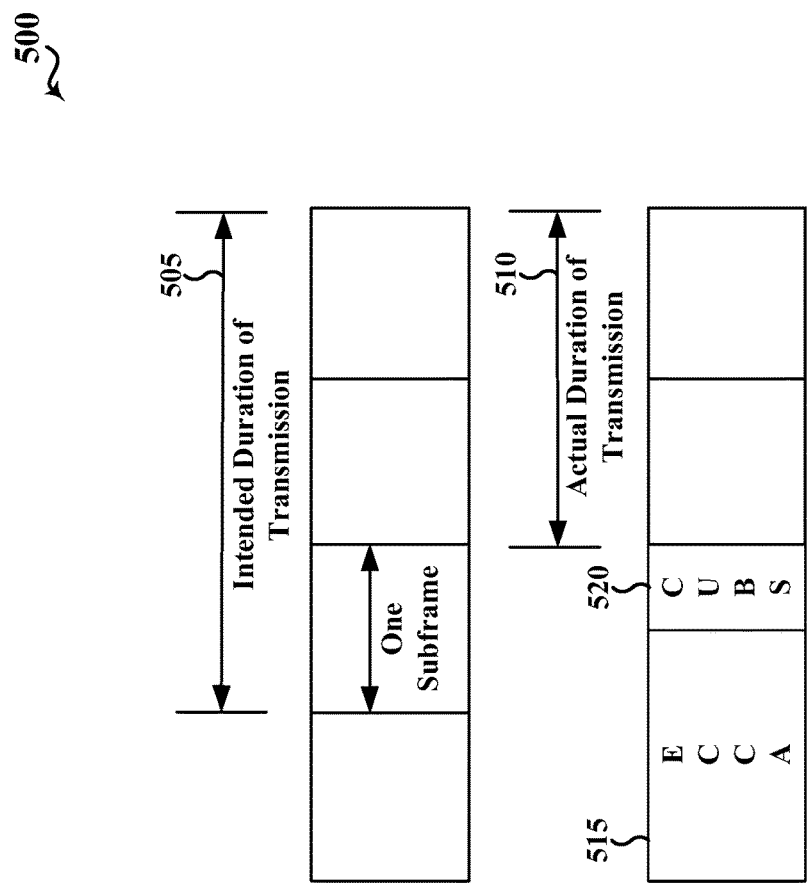
FIG. 5 is an illustration of an example of an extended CCA (ECCA) procedure performed by a transmitting apparatus when contending for access to a contention-based shared radio frequency spectrum band, in accordance with various aspects of the present disclosure.

FIG. 5 is an illustration of an example 500 of an ECCA procedure 515 performed by a transmitting apparatus when contending for access to a contention-based shared radio frequency spectrum band, in accordance with various aspects of the present disclosure. In some examples, the ECCA procedure 515 may be an example of the downlink CCA procedure 345 or uplink CCA procedure 365 described with reference to FIG. 3. The ECCA procedure 515 may include a random number of CCA procedures, and in some examples may include a plurality of CCA procedures. The ECCA procedure 515 may, therefore, have a variable duration. In some examples, the ECCA procedure 515 may be performed in accordance with an LBT-load based equipment (LBT-LBE) protocol. The ECCA procedure 515 may provide a greater likelihood of winning contention to access the contention-based shared radio frequency spectrum band, but at a potential cost of a shorter data transmission. Following the ECCA procedure 515, a channel reserving signal, such as a CUBS 520, may be transmitted, followed by a data transmission. By way of example, the data transmission may have an intended duration 505 of three subframes and an actual duration 510 of two subframes.

As indicated above, FIG. 5 is provided as an example. Other examples are possible and may differ from what was described in connection with FIG. 5.

Figure 6:
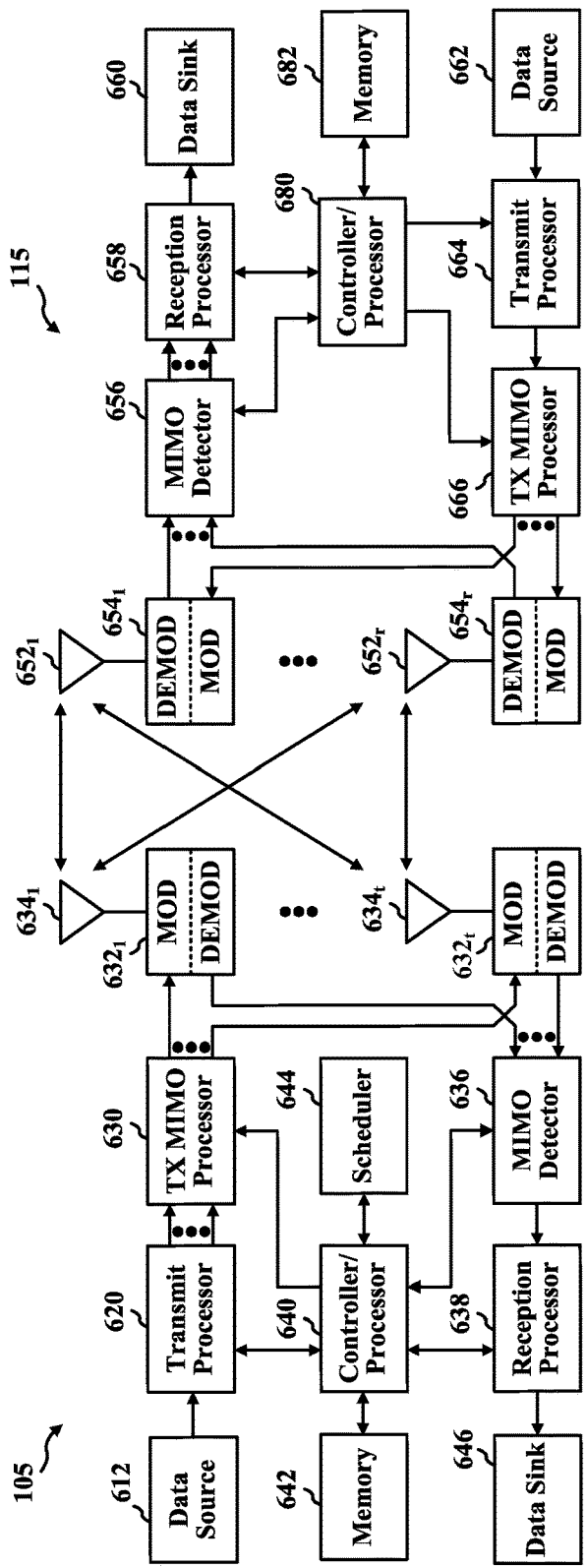
FIG. 6 shows a block diagram of a design of a base station/eNB and a UE, which may be one of the base stations/eNBs and one of the UEs in FIG. 1.

FIG. 6 shows a block diagram of a design of a base station/eNB 105 and a UE 115, which may be one of the base stations/eNBs and one of the UEs in FIG. 1. The eNB 105 may be equipped with antennas 634a through 634t, and the UE 115 may be equipped with antennas 652a through 652r. At the eNB 105, a transmit processor 620 may receive data from a data source 612 and control information from a controller/processor 640. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 620 may process (e.g., encode and symbol map) the data and control information to obtain data symbols and control symbols, respectively. The transmit processor 620 may also generate reference symbols, e.g., for the primary synchronization signal (PSS), secondary synchronization signal (SSS), and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 115, the antennas 652a through 652r may receive the downlink signals from the eNB 105 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 115 to a data sink 660, and provide decoded control information to a controller/processor 680.

On the uplink, at the UE 115, a transmit processor 664 may receive and process data (e.g., for the physical uplink shared channel (PUSCH)) from a data source 662 and control information (e.g., for the physical uplink control channel (PUCCH)) from the controller/processor 680. The transmit processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 105. At the eNB 105, the uplink signals from the UE 115 may be received by the antennas 634, processed by the modulators 632, detected by a MIMO detector 636 if applicable, and further processed by a receive processor 638 to obtain decoded data and control information sent by the UE 115. The processor 638 may provide the decoded data to a data sink 646 and the decoded control information to the controller/processor 640.

The controllers/processors 640 and 680 may direct the operation at the eNB 105 and the UE 115, respectively. The controller/processor 640 and/or other processors and components at the eNB 105 may perform or direct the execution of various processes for the techniques described herein. The controllers/processor 680 and/or other processors and components at the UE 115 may also perform or direct the execution of the functional blocks illustrated in FIGS. 7-13, and/or other processes for the techniques described herein. The memories 642 and 682 may store data and program codes for the eNB 105 and the UE 115, respectively. A scheduler 644 may schedule UEs for data transmission on the downlink and/or uplink.

A device, such as a UE, may have multiple antennas (N) to use for receiving and/or transmitting signals. The device may divide the use and assignment of the antennas to use for particular radio access technologies (RATs), such as LTE, Wi-Fi, etc., for particular carrier frequencies, or both. For example, the device may use a fixed number of antennas for one carrier in CA cases, or it may use a fixed number of antennas for Wi-Fi when the device supports both Wi-Fi and other technologies, such as LTE. In one example, a UE may have four antennas and assign two of the antennas for Wi-Fi communication and two antennas for LTE communications. A device, such as a UE, may also dynamically or semi-statically select a number of antennas for one technology or one carrier (antenna selection). In such dynamic or semi-static schemes, the sharing or selection may be triggered by a particular measurement result, such as channel quality indicator (CQI), reference signal receive power (RSRP), and the like.

Communications networks, such as LTE, may have frequency division multiplexing (FDM) implementations and time division multiplexing (TDM) implementations. Sharing options in FDM implementations are not truly sharing different antennas, but rather sharing the frequency spectrum received over the antenna. For example, a UE may use a diplexer/switch in order to use all antennas at the same time for different air-interfaces. The diplexer/switch acts as a filter by filtering out the unwanted frequencies. However, in such FDM sharing schemes, there is typically a considerable loss in signal strength as the signals are filtered. Such losses can also increase with the higher frequency bands. TDM implementations may actually use or assign separate antennas for each air-interface/technology. Thus, when communications over such air-interfaces/technologies are not in use, those antennas that were assigned or designated for the unused communications may be shared with other air-interfaces/technologies. The various aspects of the present disclosure are directed to communication systems using TDM implementations.

In LTE-U, both the eNB and the UE perform CCA in order to access a channel. For DL transmissions, an eNB must capture the medium by performing a CCA before transmitting. Likewise, a UE must perform a CCA procedure in order to transmit UL data. The eNB and UE may use different access procedures and the LBT mechanisms. In addition, the interference conditions experienced by the eNB may be different than those experienced by the UE.

At times, the UE may be required to wait to perform the CCA operation until it receives an UL grant from the eNB. At other times, the UE may contend for the channel by performing a CCA without receiving an UL grant. Regardless of whether the UE waits for an UL grant or not, the UE performs CCA autonomously from the eNB.

Various aspects presented herein provide for mechanisms by which an eNB may control parameters of the UE channel access procedure. The eNB transmits an indication of at least one CCA parameter to the UE. The UE receives the CCA parameter(s) from the eNB and performs CCA based on the indicated parameter(s). The closed loop control of the CCA procedure by the eNB provides for greater efficiencies in the CCA procedure by the UE. The eNB may determine CCA parameters for use by the UE based on its own knowledge and/or the eNB may use information provided by the UE in order to determine the CCA parameters for the UE.

Figure 7:
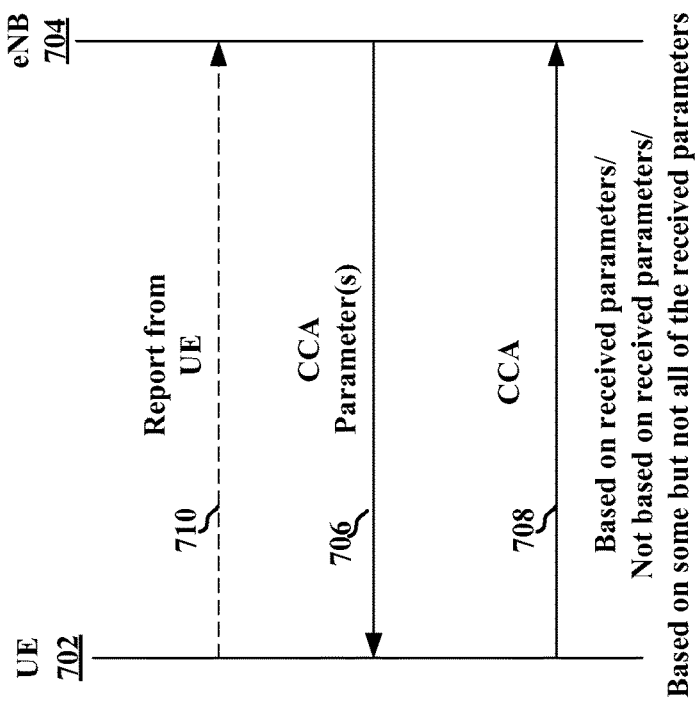
FIG. 7 is a block diagram illustrating an example of wireless communication in accordance with various aspects of the present disclosure.

FIG. 7 illustrates an example interaction between a UE 702 and an eNB 704 in accordance with the present disclosure. The UE 702 may be UE 115 in FIG. 6 or apparatus 902/902' in FIGS. 9 and 10. The eNB 704 may be eNB 105 in FIG. 6 or apparatus 1202/1202' in FIGS. 12 and 13.

At 710, the UE 702 may optionally transmit one or more reports to eNB 704. The eNB may use information in the one or more reports from the UE in determining the CCA parameters to send to the UE. The one or more reports may identify UE properties, capabilities, and or detected channel conditions. For example, the UE may report the type of Wi-Fi packets received by the UE, interference measurements, CCA clearance statistics, etc. The UE may also use other observed information, e.g., about one or more RATs and use this observed information to determine the CCA parameters to send to the eNB. For example, the UE may receive a cumulative distribution function (CDF) of a received signal strength indicator (RSSI) and/or an average/mean/median RSSI for the RAT(s). The UE may consider what percentage of observed time the channel RSSI is above a threshold for the RAT(s). The UE may also observe discovery signals of other technologies.

At 706, the eNB 704 transmits an indication of at least one CCA parameter to the UE 702. The CCA parameters may be transmitted to the UE in any of an UL grant, a DL grant, a broadcast directed to multiple UEs, an RRC message, or a MAC control element.

At 708, after receiving the transmission from the eNB, the UE performs one or a plurality of CCAs based on the parameters indicated by the eNB. By example, the parameters indicated by the eNB may impact various aspects of the CCA procedure including thresholds for a successful CCA as well as backoff subsequent to an unsuccessful CCA. The UE may first determine whether or not to respect the indication from the eNB. For example, the UE may use all of the indicated CCA parameters to perform CCA. The UE may determine not to use any of the indicated CCA parameters and to instead use other parameters for CCA. The UE may determine to use a portion, but not all, of the indicated parameters for CCA.

This may be done in any of a number of ways. In one example, the UE may determine or consider that the information at the eNB is outdated. For example, if the UE needs to transmit traffic of a certain LBT priority class, the eNB LBT parameters may not allow this traffic to be multiplexed. This limitation may be based on multiplexing rules, e.g., in 3GPP, because the eNB does not have the latest buffer status report (BSR) available. Also the BSR may not tell the split of traffic across different priority classes. Therefore, when the eNB indicates parameters for the CCA with such limitations, the UE may determine to override at least a portion of these CCA parameters from the eNB and to instead use its own determined parameters.

A second example may include cross-carrier scheduling based UL transmission. In this example, the eNB may send CCA parameters in the grant a few ms earlier, but due to changed circumstances on the unlicensed carrier, the UE may not be able to follow the eNB grant parameters. In this example the UE may determine to disregard at least a portion of the CCA parameters from the eNB.

In another example, the UE may determine not to use the CCA parameters received from the eNB because of in-device coexistence (IDC) requirements at the UE. When there is a conflict between the CCA parameters received from the eNB and the IDC requirements of the UE, the UE may determine to ignore at least a portion of the CCA parameters from the eNB.

Figure 8:
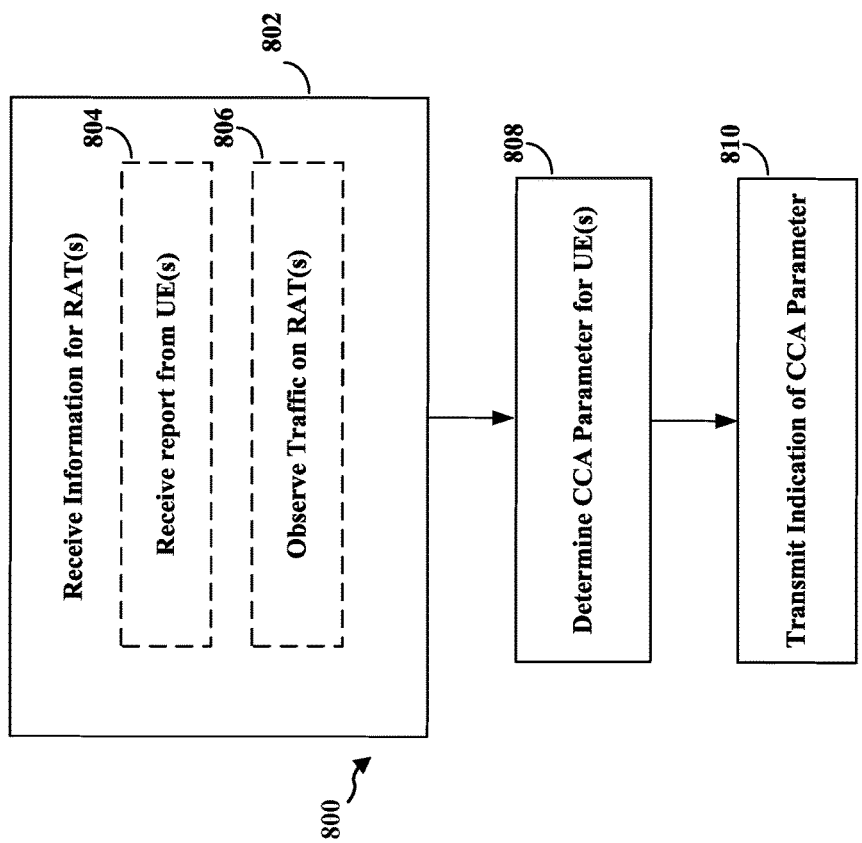
FIG. 8 shows a flow chart of a method of wireless communication in accordance with various aspects of the present disclosure.

FIG. 8 is a flow chart 800 of a method of wireless communication. The method may be performed by an eNB (e.g., the eNB 105, 704, the apparatus 902/902'). Optional aspects of FIG. 8 are illustrated using a dashed line.

At 802, the eNB receives information regarding wireless communication on one or more RATs. The eNB may optionally receive one or more reports from at least one UE, at 804, prior to determining the CCA parameter to send to the UE, e.g., at 808. The report may provide information about channel conditions or UE properties that may affect the selection of a CCA parameter by the eNB. The eNB may receive the information by observing traffic on the one or more RATs. At 806, the UE may observe traffic at least one RAT in order to determine channel conditions, etc.

At 808, the eNB determines a CCA parameter(s) for use by at least one UE in performing a CCA procedure for UL transmission.

At 810, the eNB transmits an indication of the CCA parameter(s) to the UE.

In alternative aspects, the eNB (at 808) may determine a set of CCA parameters for the UE and may transmit the set of CCA parameters to the UE (at 810). The set of CCA parameters may include one or more CCA parameters impacting different aspects of the CCA procedure.

As a part of performing CCA, the UE senses the energy on the intended channel. When the energy sensed by the UE is below a certain amount, referred to herein as the CCA threshold, the UE may determine that the channel is clear for CCA purposes. In one example, the CCA parameter may comprise a CCA threshold to be used by the UE. This may include a CCA threshold per slot so that different CCA slots have different thresholds. For example, the CCA parameter may indicate that the last few CCA slots or the last CCA slot have a different CCA threshold.

In addition to indicating a different CCA threshold for different slots, the CCA parameter may also indicate that the CCA threshold should change based on a transmission number. For example, the UE may use a lower CCA threshold when clearing the channel on its first CCA transmission. The eNB may indicate that the UE should increase the CCA threshold for additional CCA transmissions. The increase may occur each time the UE makes a CCA transmission until the UE passes CCA.

In another example, the CCA parameter may comprise an indication of a backoff scheme.

Backoff may be used by the UE to determine when to perform another CCA transmission. After failing a first CCA, the UE may wait a certain number of slots before sending another CCA transmission. The number of slots may be based on a random number, e.g., N. If the UE continues to fail the CCA procedure, the UE may increase the number, N, of slots between attempts. For example, the CCA parameter may indicate whether the UE should use a linear or an exponential backoff scheme. In a linear backoff scheme, the UE may increase the number of slots between subsequent CCA operations linearly based on the number of sequential unsuccessful CCA attempts. For example the UE may increase number of slots between subsequent CCA operations by a constant value N. If the eNB indicates an exponential backoff scheme, this instructs the UE to increase the number of slots between subsequent CCA operations exponentially based on the number of sequential unsuccessful CCA attempts. In this example the UE may increase number of slots between subsequent unsuccessful CCA operations by a power N (which may, for example, sequentially double the wait time between unsuccessful CCA attempts).

The CCA parameter may indicate whether the UE should perform a simple or an extended CCA procedure. A simple CCA procedure may comprise, e.g., a single attempt CCA procedure. An extended CCA procedure may involve the UE making multiple CCA transmissions when the first CCA transmission fails, and incorporates a backoff procedure.

The CCA parameter may also indicate that the UE should begin transmission without performing any CCA procedure.

The backoff scheme may also be a function of the channel. For example, a higher priority may be used for a discovery reference signal (DRS). Similar mechanisms may be applicable to PUCCH, SRS, or PRACH on the UL. These transmissions may have a higher priority and be assigned different CCA parameters. Thus, the CCA parameter may comprise an indication of the channel access scheme, where the indicated channel access scheme may assign different CCA parameters to different UL channels.

In another example, the CCA parameter may comprise a duration for at least a portion of slots for the CCA. The CCA parameter may indicate a duration for all of the CCA slots or for some particular CCA slots. For example, the CCA parameter may indicate that the last CCA slot has a longer duration than the other CCA slots. Changing the duration of the last CCA slot may help the UE to avoid Wi-Fi interference.

In another example, the CCA parameter may comprise an indication of whether to respect a particular reservation signal type. Among others, such reservation signal types may include at least one of a Wi-Fi reservation signal, a reservation signal associated with the UE deployment, or a reservation signal associated with another license assisted access deployment. The Wi-Fi preamble carries information regarding the length of a packet transmission. When the UE receives such a Wi-Fi preamble, it may respect the preamble by not transmitting during the indicated duration of the Wi-Fi packet. In certain circumstances, the UE may ignore the Wi-Fi preamble and transmit during the indicated transmission. The UE is able to respect the Wi-Fi packet or to ignore such Wi-Fi packet transmissions. The eNB may instruct the UE via the CCA parameter whether the UE should respect such a reservation signal from Wi-Fi nodes. The CCA parameter from the eNB may indicate whether the UE should respect such reservation signals corresponding to its own deployment and/or to other LAA deployments.

In another example, the indication may comprise information regarding a transmit power that indirectly affects the CCA threshold. For example, the information may comprise a change in transmit power or a maximum transmit power. The CCA threshold may be a function of the maximum transmit power. Thus, an indication of the maximum transmit power may be used to inform the UE of the CCA threshold that it should use for the CCA procedure.

In another example, the CCA parameter may comprise an indication of whether to transmit a Wi-Fi channel usage beacon signal (W-CUBS). The Wi-Fi preamble may be configured as a CUBS for LTE-U that may includes both a Wi-Fi component and an LTE component. The CCA parameter may indicate to the UE whether it should transmit such a W-CUBS, and may indicate whether the UE should transmit a particular portion of the W-CUBS. For example, the CCA parameter may indicate whether the UE should transmit a Wi-Fi portion of the W-CUBS and/or an LTE portion of the W-CUBS. This indication from the eNB may help the UE to avoid wasting an unnecessary transmission. For example, if the eNB is aware that there are no Wi-Fi nodes in the area, the eNB may stop the UE from transmitting an unnecessary portion of the W-CUBS.

In another example, the CCA parameter may indicate whether contention based access is enabled for the UL transmission. When contention based access is enabled, the UE can contend for the channel without an UL grant from the eNB. Thus, by indicating to the UE whether or not contention based access is enabled, the eNB informs the UE whether it should wait for an UL grant before performing CCA, or whether it can begin performing a CCA operation without waiting for an UL grant. Additionally, multiple UL grants may be sent to different UEs. The UEs may then contend for ability to transmit according to their UL grant. Thus, the CCA parameter may indicate to the UE whether or not the eNB is enabling such contention based access.

In another example, the CCA parameter may indicate whether an UL CCA Exempt Transmission (UL-CET) is enabled. For example, each node may have a small percentage, e.g., approximately 5%, of the duty cycle during which they may transmit without sensing the channel to ensure that it is clear. The eNB may control whether or not the UE is able to perform such a UL-CET transmission. This type of a transmission may be reserved for higher priority transmissions rather than a data transmission.

In one example, the indication of the CCA parameter may be transmitted to the UE in an UL grant or in a DL grant. In another example, the CCA parameter may be transmitted to the UE in an RRC message using RRC signaling. In another example, the CCA parameter may be transmitted to the UE using MAC control elements. For example, a CCA parameter involving any of a CCA threshold increase/decrease, enabling special CCA slot duration and/or threshold for a portion of the slots, W-CUBS transmission, etc. may be indicated in an UL grant to the UE. Other CCA parameters may be indicated using RRC signaling or MAC control elements.

The transmission at 804 may be directed from the eNB to a specific UE. This example enables different CCA parameters to be transmitted to different UEs.

Some CCA parameters may be controlled dynamically on a per subframe or per grant basis while other parameters may be controlled semi-statically. A single CCA parameter may be transmitted to the UE. Alternately, multiple CCA parameters may be provided to the UE.

Rather than being transmitted to a single UE, the CCA parameter(s) may be sent to multiple UEs. The CCA parameter(s) may be broadcast to multiple UEs. The broadcast CCA parameter information may be transmitted, e.g., using a system information block (SIB) dedicated to the unlicensed spectrum. In one example, the broadcast of the CCA parameter may involve a new DL control information (DCI) format with a radio network temporary identifier (RNTI) known to a group of UEs or broadcast as part of a common RRC message.

The eNB may transmit an indication of common CCA parameter(s) to a defined group of UEs. The common CCA parameter(s) may be transmitted to each of the UEs in the defined group individually or as a broadcast. The defined group may comprise a set of UEs grouped for FDM or Multiple User MIMO (MU-MIMO) operation. By providing common CCA parameters to a group of UEs ensures that the UEs will have the same set of CCA parameters.

A UE may be a part of several defined groups of UEs, and each defined group of UEs may have its own set of common CCA parameters. Thus, the eNB may transmit multiple sets of CCA parameters to a single UE, each set including at least one CCA parameter.

The eNB may transmit an indication of a single CCA parameter to the UE(s). Alternatively, the eNB may indicate multiple CCA parameters to the UE. Thus, the transmission from the eNB may include any combination of the CCA parameters described herein.

In addition to receiving one report from a UE, the eNB may receive multiple reports, e.g., from multiple UEs. These reports may affect the selection of CCA parameters at the eNB for UL transmission. For example, the eNB may receive a report of the type of Wi-Fi packets received by the UE, e.g., ready to send (RTS)/clear to send (CTS)/clear to send to self (CTS2S). In another example, the eNB may receive a report comprising interference measurement. The report may comprise an interference measurement report for DL transmission. In another example, the report may comprise CCA clearance statistics on the UL. A new procedure or measurement objection may be defined for reporting such CCA statistics. Thus, the eNB may use a report from a UE in order to control the CCA operation of the UE by sending CCA parameters to the UE.

Figure 9:
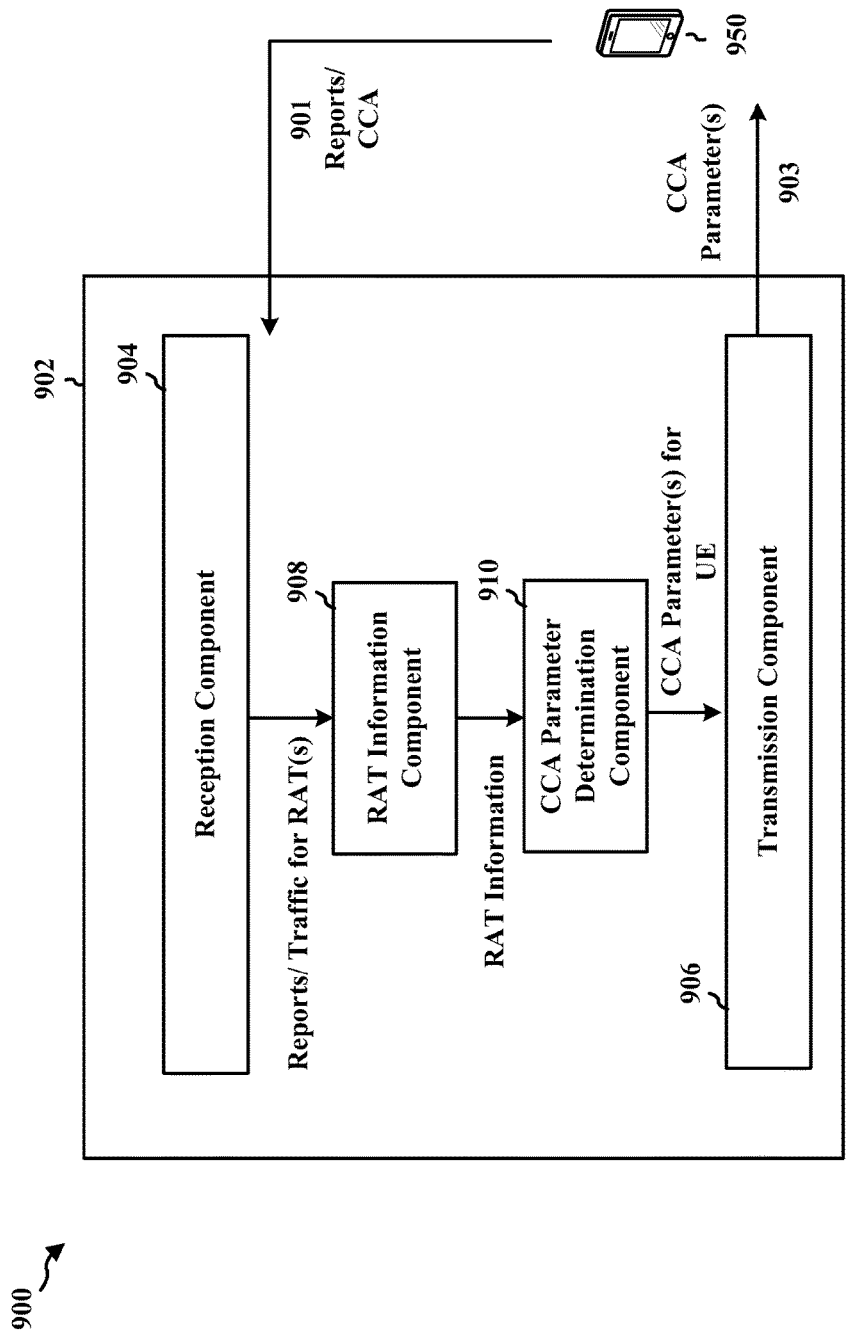
FIG. 9 shows a conceptual data flow diagram illustrating the data flow between different means/components in an example apparatus.

FIG. 9 is a conceptual data flow diagram 900 illustrating the data flow between different means/components in an exemplary apparatus 902. The apparatus may be an eNB. The apparatus includes a reception component 904 that receives transmissions 901 from at least one UE 950 and a transmission component 906 that transmits communication 903 such as recommended CCA parameters and other downlink communication to UE(s) 950. The apparatus includes a RAT information component 908 that receives information regarding wireless communication on one or more RATs. The apparatus includes a CCA parameter determination component that determines a CCA parameter to be used by a UE in performing a CCA procedure, e.g., for UL transmission based on the received information. The CCA parameter determination component may determine the CCA parameter based on information from one or more reports received from the UE indicating UE channel conditions and/or capabilities. The CCA parameter determination component may determine the CCA parameters based on traffic observations on multiple RATs. Once a CCA parameter is determined, the CCA Parameter determination component 910 provides the CCA parameters to the transmission component for transmission of an indication of the determined CCA parameter to at least one UE.

The CCA parameter may be transmitted from the apparatus 902 to the UE(s) 950 in an UL grant or DL grant. The CCA parameter may be transmitted in an RRC message or as a MAC control element. Although the CCA parameter may be communicated in a transmission to a specific UE, it may also be transmitted to multiple UEs. In one example, the CCA parameter may be broadcast to multiple UEs 950. Among other ways to broadcast the CCA parameter to multiple UEs, it may be broadcast through a new DCI format with an RNTI known to a group of UEs or broadcast as part of a common RRC message.

The apparatus may receive information in a transmission from the UE(s) 950. Among others, the report may include a type of Wi-Fi packets received by the UE, an interference measurement, and/or CCA clearance statistics. The CCA parameter determination component 910 may use information comprised in the report in at least a part of the CCA parameter determination.

The apparatus may include additional components that perform each of the blocks of the algorithm in the aforementioned flow chart of FIG. 8. As such, each block in the aforementioned flow charts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
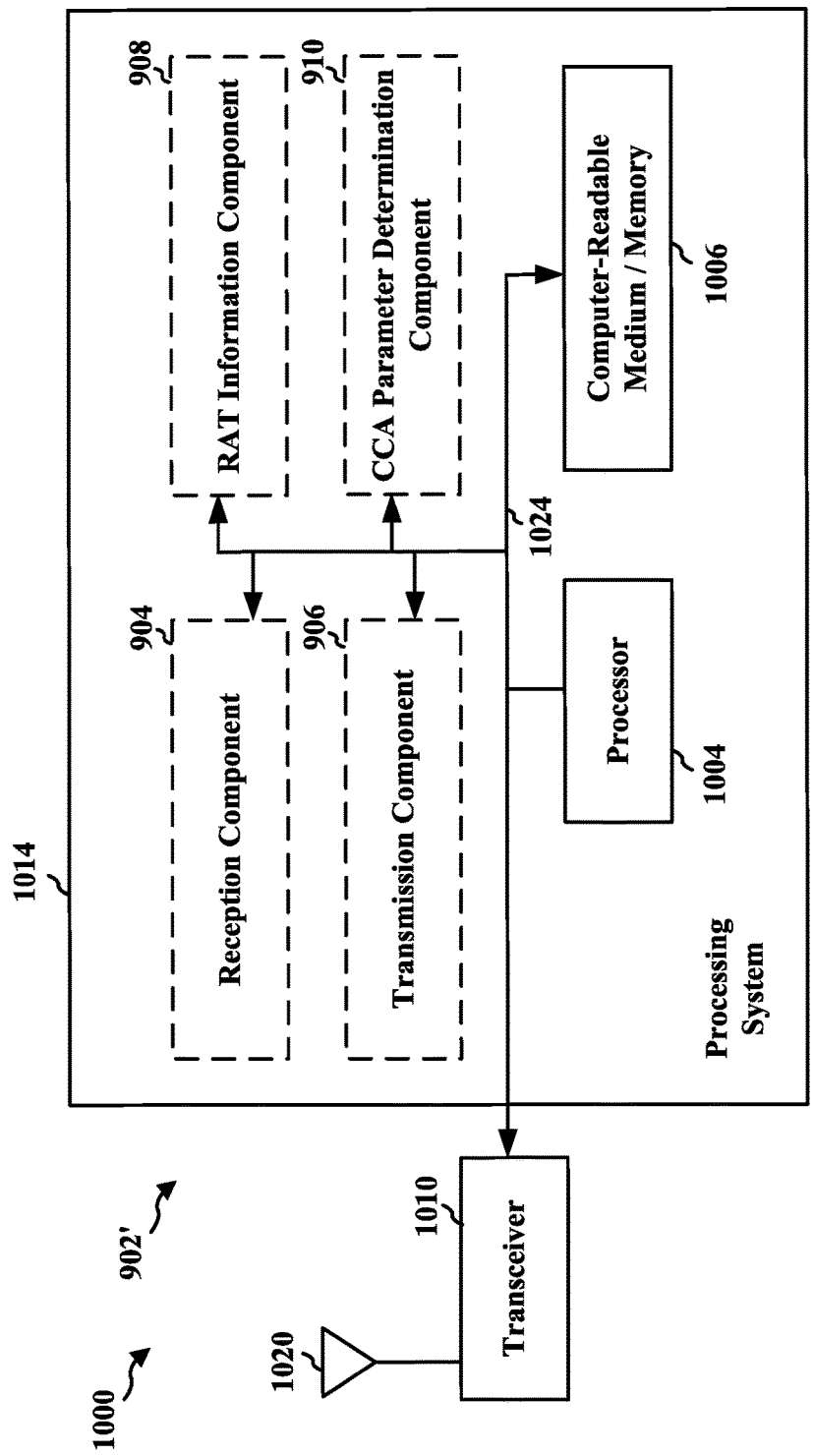
FIG. 10 shows a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the components 904, 906, 908, and 910. The components may be software components running in the processor 1004, resident/stored in the computer readable medium/memory 1006, one or more hardware components coupled to the processor 1004, or some combination thereof. The processing system 1014 may be a component of the eNB 105 and may include the memory 642 and/or at least one of the TX processor 620, the RX processor 638, and the controller/processor 640.

In one configuration, the apparatus 902/902' for wireless communication includes means for determining a CCA parameter for use by a UE in performing a CCA procedure for UL transmission, means for transmitting an indication of the CCA parameter to the UE. The apparatus 902/902' may include means for receiving report from the UE. For example, the report may comprise at least one of a type of Wi-Fi packets received by the UE, an interference measurement report, and CCA clearance statistics. The means for determining the CCA parameter may determine the CCA parameter at least in part using the received report. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 620, the RX Processor 638, and the controller/processor 640. As such, in one configuration, the aforementioned means may be the TX Processor 620, the RX Processor 638, and the controller/processor 640 configured to perform the functions recited by the aforementioned means.

Figure 11:
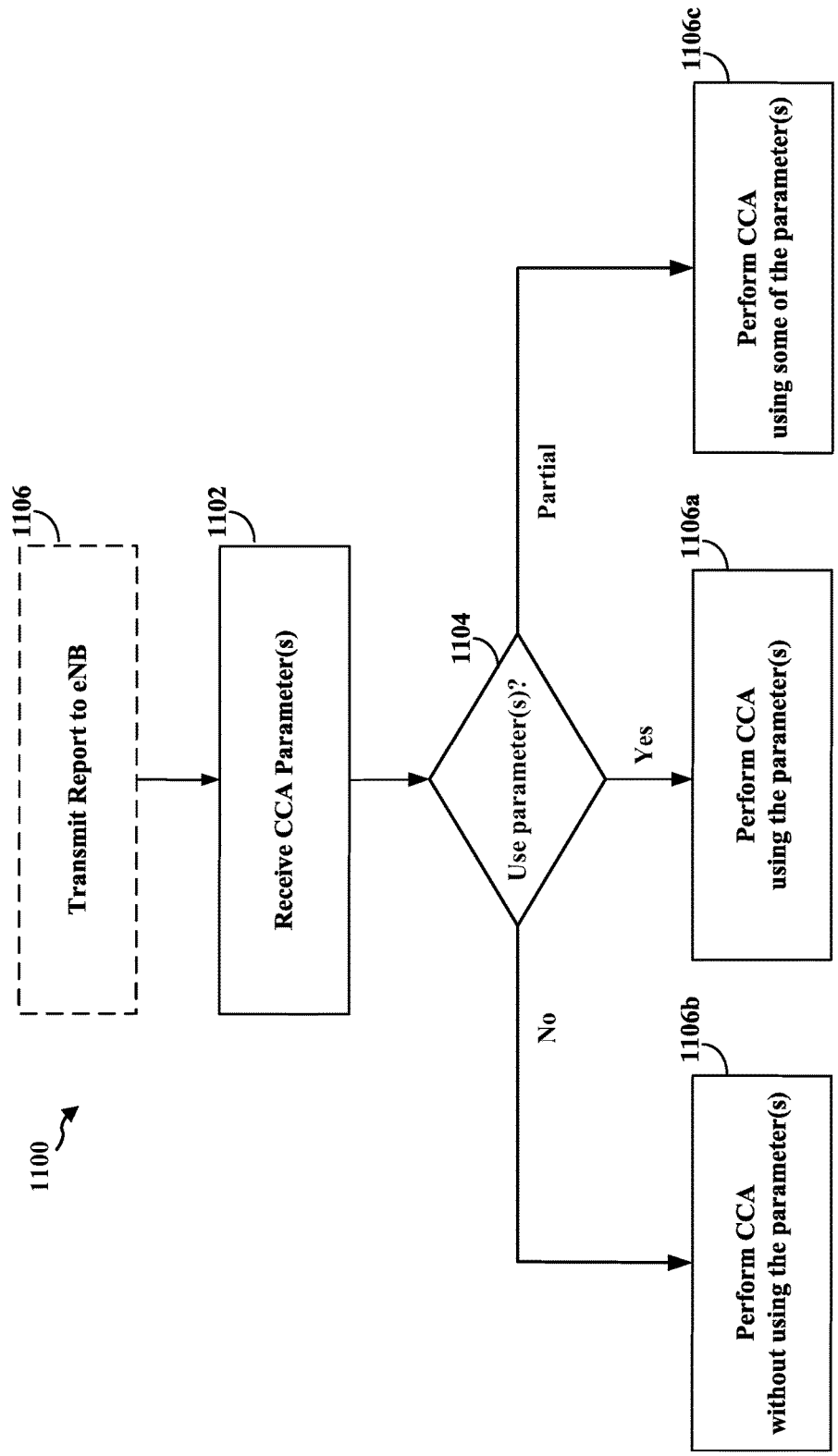
FIG. 11 shows a flow chart of a method of wireless communication in accordance with various aspects of the present disclosure.

FIG. 11 is a flow chart 1100 of a method of wireless communication. The method may be performed by a UE (e.g., the UE 115, 702, the apparatus 1202/1202').

At 1106, the UE may transmit a report to the eNB prior to receiving the indication of the CCA parameter. Among others, such a report may comprise at least one of a type of received Wi-Fi packets, an interference measurement report for DL transmission, and CCA clearance statistics prior to receiving the indication of the CCA parameter. The report may assist the eNB in determining the CCA parameter indication to send to the UE, as described in connection with items 802 and 808 of FIG. 8.

At 1102, the UE receives an indication of a CCA parameter for use in performing a CCA procedure for UL transmission. In alternative aspects, the UE may receive a set of CCA parameters, where the set of CCA parameters may include one or more CCA parameters impacting different aspects of the CCA procedure.

At 1104, the UE determines whether to use the at least one CCA parameter in performing the CCA procedure for UL transmission. This determination may be based on the UE determining that information at the eNB is outdated, that circumstances have changed since the eNB sent the CCA parameters, and/or that there is a conflict between the CCA parameters and other requirements of the UE.

This may be done in any of a number of ways. In one example, the UE may determine or consider that the information at the eNB is outdated. For example, if the UE needs to transmit traffic of a certain LBT priority class, the eNB LBT parameters may not allow this traffic to be multiplexed. This limitation may be based on multiplexing rules, e.g., in 3GPP, because the eNB does not have the latest buffer status report (BSR) available. Also the BSR may not tell the split of traffic across different priority classes. Therefore, when the eNB indicates parameters for the CCA with such limitations, the UE may determine to override at least a portion of these CCA parameters from the eNB and to instead use its own determined parameters.

A second example may include cross-carrier scheduling based UL transmission. In this example, the eNB may send CCA parameters in the grant a few ms earlier, but due to changed circumstances on the unlicensed carrier, the UE may not be able to follow the eNB grant parameters. In this example the UE may determine to disregard at least a portion of the CCA parameters from the eNB.

In another example, the UE may determine not to use the CCA parameters received from the eNB because of in-device coexistence (IDC) requirements at the UE. When there is a conflict between the CCA parameters received from the eNB and the IDC requirements of the UE, the UE may determine to ignore at least a portion of the CCA parameters from the eNB.

Then, the UE performs the CCA procedure for UL transmission. The UE may use the indicated CCA(s) parameter to perform CCA at 1106a. The UE may determine not to respect the indicated parameters and may instead use a different CCA parameter/parameters to perform CCA at 1106b. The UE may determine to use some, but not all, of the CCA parameters to perform CCA at 1106c.

The indication may be received in at least one of an UL grant, a DL grant, a broadcast directed to multiple UEs, an RRC message, or a MAC control element. The indication may correspond to the transmission from an eNB described in connection with FIG. 8.

An eNB may transmit an indication of common CCA parameter(s) to a defined group of UEs. The defined group may comprise a set of UEs grouped for FDM or MU-MIMO operation. By providing common CCA parameters to a group of UEs ensures that the UEs will have the same set of CCA parameters.

A UE may be a part of several defined groups of UEs, and each defined group of UEs may have its own set of common CCA parameters. Thus, the UE may receive multiple sets of CCA parameters from an eNB, each set including at least one CCA parameter.

Figure 12:
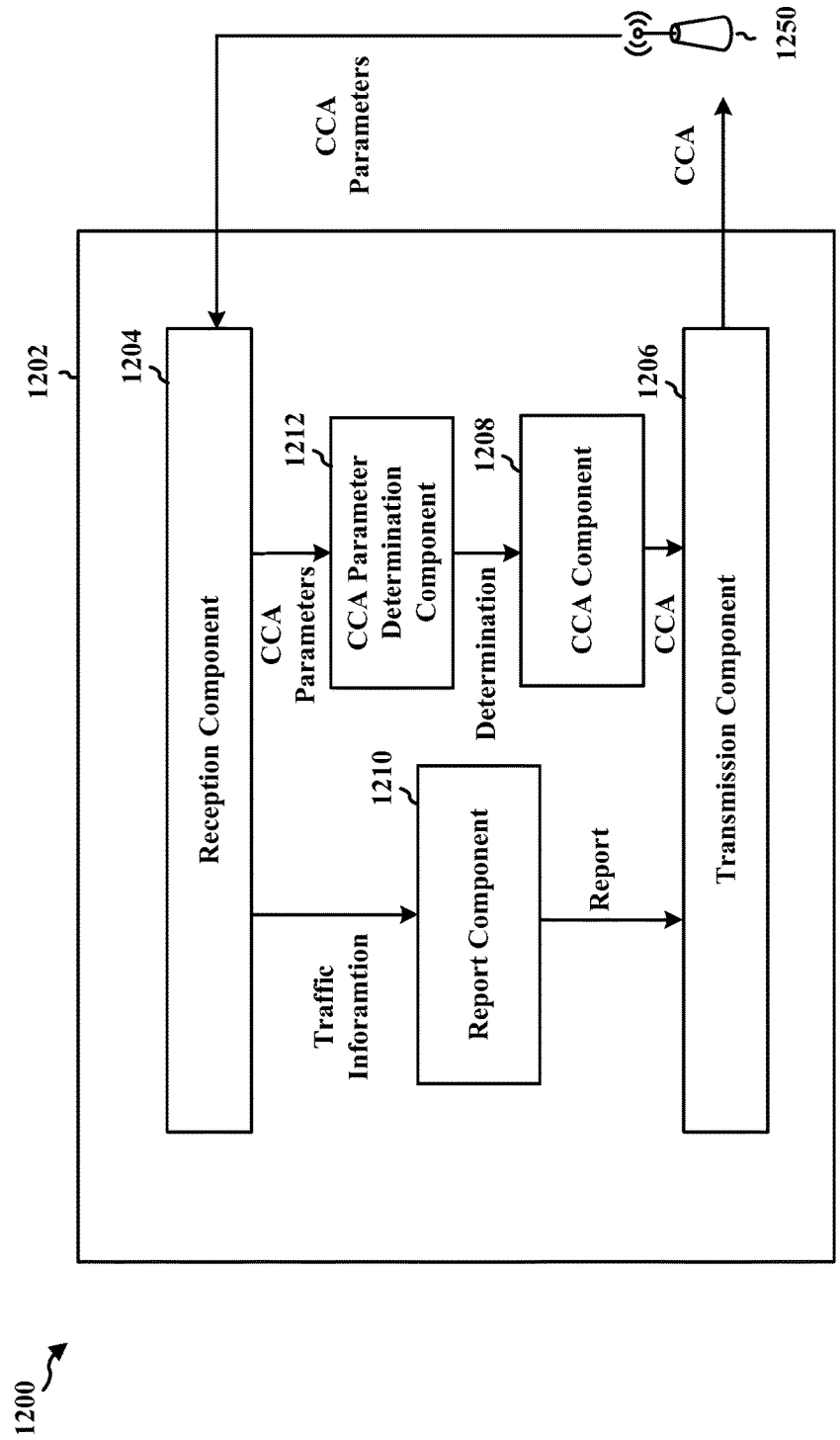
FIG. 12 shows a conceptual data flow diagram illustrating the data flow between different means/components in an example apparatus.

FIG. 12 is a conceptual data flow diagram 1200 illustrating the data flow between different means/components in an exemplary apparatus 1202. The apparatus may be a UE. The apparatus includes a reception component 1204 that receives transmissions from an eNB 1250 and a transmission component 1206 that transmits communication, including CCA and possible reports, to the eNB 1250. The apparatus 1202 also includes a CCA component 1208 that performs a CCA operation. The reception component 1204 may receive an indication of at least one CCA parameter for use in performing a CCA procedure for UL. The apparatus may include a CCA Parameter Determination Component 1212 that determines whether to use the at least one CCA parameter in performing the CCA procedure for UL transmission and provide the determination to the CCA component 1208. The CCA component 1208 may then communicate with transmission component 1206 to cause the apparatus to perform a CCA procedure for UL transmission using the indicated parameter received from the eNB.

The reception component may receive the indication of the CCA parameter in an UL grant or a DL grant from the eNB. The transmission comprising the CCA parameter may be directed to the apparatus. Alternatively, the apparatus may receive the indication of the parameter in a broadcast directed to multiple UEs. The indication of the CCA parameter may also be received in an RRC message or a MAC control element.

The apparatus may further comprise a report component 1210 that generates a report for transmission to the eNB 1250. For example, the report may include at least one of a type of received Wi-Fi packets, an interference measurement report for DL transmission, and CCA clearance statistics prior to receiving the indication of the CCA parameter. The report component may provide the report information to the transmission component 1206 for transmission to the eNB 1250. The report component may use information received at the reception component 1204 and provided to the report component to generate the report.

The apparatus may include additional components that perform each of the blocks of the algorithm in the aforementioned flow charts of FIG. 11. As such, each block in the aforementioned flow charts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
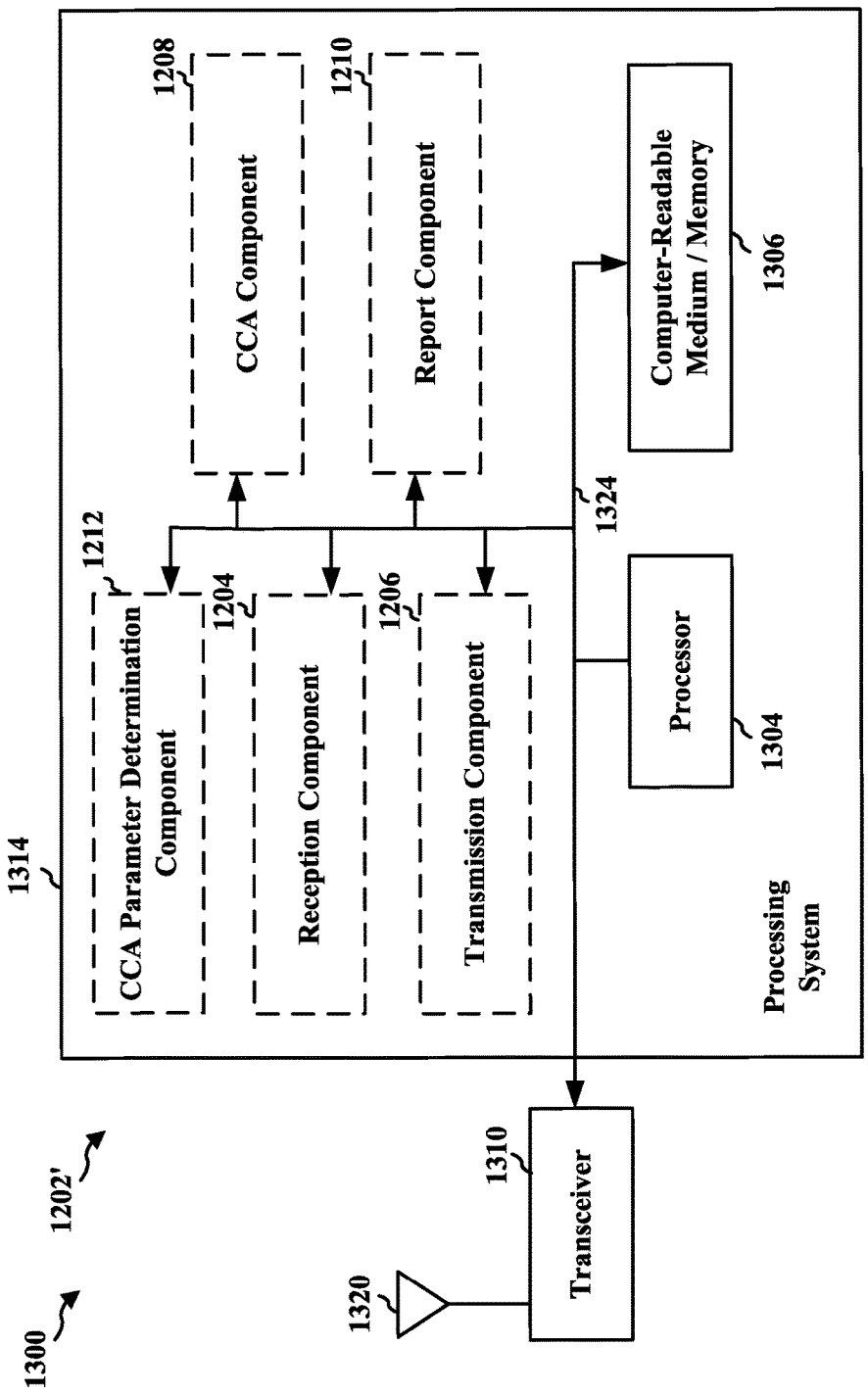
FIG. 13 shows a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1202, 1204, 1206, 1208, 1210, 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the components 1202, 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the UE 115 and may include the memory 682 and/or at least one of the TX processor 664, the RX processor 658, and the controller/processor 680.

In one configuration, the apparatus 1202/1202' for wireless communication includes means for receiving an indication of a CCA parameter for use in performing a CCA procedure for UL transmission and means for performing the CCA procedure for UL transmission using the indicated parameter. The apparatus 1202/1202' may comprise means for transmitting a report to the eNB prior to receiving the indication of the CCA parameter. For example, the report may comprise any of a type of received Wi-Fi packets, an interference measurement report for DL transmission, and CCA clearance statistics. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 664, the RX Processor 658, and the controller/processor 680. As such, in one configuration, the aforementioned means may be the TX Processor 664, the RX Processor 658, and the controller/processor 680 configured to perform the functions recited by the aforementioned means.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and components in FIGS. 9, 10, and 12, and 13 may comprise processors, electronics devices, hardware devices, electronics components, logical circuits, memories, software codes, firmware codes, etc., or any combination thereof.

Those of skill would further appreciate that the various illustrative logical blocks, components, circuits, and algorithm steps described in connection with the disclosure herein may be implemented as electronic hardware, computer software, or combinations of both. To clearly illustrate this interchangeability of hardware and software, various illustrative components, blocks, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, components, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software component executed by a processor, or in a combination of the two. A software component may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication at a base station, comprising:
   receiving information regarding wireless communication on multiple Radio Access Technologies (RATs) that operate on an unlicensed spectrum;
   determining at least one clear channel assessment (CCA) parameter for use by a user equipment (UE) in performing a CCA procedure for uplink (UL) communication comprising communication on the unlicensed spectrum, wherein the at least one CCA parameter is determined based on the received information regarding wireless communication on multiple Radio Access Technologies (RATs) that operate on the unlicensed spectrum; and
   transmitting an indication of the at least one CCA parameter from the base station to the UE, wherein the at least one CCA parameter is broadcast to multiple UEs through a new downlink control information (DCI) format with a radio network temporary identifier (RNTI) known to a group of UEs.

2. The method of claim 1, wherein receiving the information includes receiving a report from at least one UE.

3. The method of claim 1, wherein receiving the information comprises observing traffic on the multiple RATs.

4. The method of claim 1, wherein the at least one CCA parameter comprises a CCA threshold to be used by the UE per slot, wherein different CCA thresholds are indicated for different slots.

5. The method of claim 1, wherein the at least one CCA parameter indicated to the UE from the base station comprises an indication of one of a channel access scheme or a backoff scheme.

6. The method of claim 1, wherein the at least one CCA parameter indicated to the UE from the base station comprises an indication of a channel access scheme, the indicated channel access scheme being different for each UL channel.

7. The method of claim 1, wherein the at least one CCA parameter comprises a duration for at least a portion of slots for the CCA procedure, wherein different slots have different durations.

8. The method of claim 1, wherein the at least one CCA parameter comprises an indication of whether to respect a reservation signal type, the reservation signal type being at least one of
   a Wi-Fi reservation signal,
   a reservation signal associated with a UE deployment, or
   a reservation signal associated with another license assisted access deployment.

9. The method of claim 1, wherein the indication comprises a change in transmit power or a maximum transmit power.

10. A method of wireless communication at a base station, comprising:
    receiving information regarding wireless communication on multiple Radio Access Technologies (RATs) that operate on an unlicensed spectrum;
    determining at least one clear channel assessment (CCA) parameter for use by a user equipment (UE) in performing a CCA procedure for uplink (UL) communication comprising communication on the unlicensed spectrum, wherein the at least one CCA parameter is determined based on the received information regarding wireless communication on multiple Radio Access Technologies (RATs) that operate on the unlicensed spectrum; and
    transmitting an indication of the at least one CCA parameter from the base station to the UE, wherein the at least one CCA parameter indicates whether to transmit a Wi-Fi channel usage beacon signal (W-CUBS) when performing the CCA procedure.

11. The method of claim 10, wherein the indication is transmitted to the UE in at least one of
    an UL grant,
    a downlink (DL) grant,
    a radio resource control (RRC) message, or
    a medium access control (MAC) control element.

12. The method of claim 11, wherein the information is received from the UE, and comprises at least one of a type of Wi-Fi packets received by the UE, an interference measurement report for downlink (DL) transmission, and CCA clearance statistics,
    wherein the at least one CCA parameter is determined at least in part using the information received from the UE.

13. A method of wireless communication at a base station, comprising:

receiving information regarding wireless communication on multiple Radio Access Technologies (RATs) that operate on an unlicensed spectrum;

determining at least one clear channel assessment (CCA) parameter for use by a user equipment (UE) in performing a CCA procedure for uplink (UL) communication comprising communication on the unlicensed spectrum, wherein the at least one CCA parameter is determined based on the received information regarding wireless communication on multiple Radio Access Technologies (RATs) that operate on the unlicensed spectrum; and transmitting an indication of the at least one CCA parameter from the base station to the UE, wherein the at least one CCA parameter indicates whether contention based access is enabled for UL transmission, wherein when the at least one CCA parameter indicates that the contention based access is enabled, the UE can contend for a channel without an UL grant from the base station, and wherein when the at least one CCA parameter indicates that the contention based access is not enabled, the UE waits for the UL grant from the base station to contend for the channel.

14. The method of claim 1, wherein the at least one CCA parameter indicates whether an uplink CCA Exempt Transmission (UL-CET) is enabled.

15. An apparatus for wireless communication at a base station, comprising:

means for receiving information regarding wireless communication on multiple Radio Access Technologies (RATs) that operate on an unlicensed spectrum;

means for determining at least one clear channel assessment (CCA) parameter for use by a user equipment (UE) in performing a CCA procedure for uplink (UL) communication comprising communication on the unlicensed spectrum, wherein the at least one CCA parameter is determined based on the received information regarding wireless communication on multiple Radio Access Technologies (RATs) that operate on the unlicensed spectrum; and means for transmitting an indication of the at least one CCA parameter from the base station to the UE, wherein the at least one CCA parameter is broadcast to multiple UEs through a new downlink control information (DCI) format with a radio network temporary identifier (RNTI) known to a group of UEs.

16. The apparatus of claim 15, wherein receiving the information includes at least one of receiving a report from at least one UE or observing traffic on the multiple RATs.

17. The apparatus of claim 15, wherein the indication is transmitted to the UE in at least one of an UL grant,
a downlink (DL) grant,
a radio resource control (RRC) message, or
a medium access control (MAC) control element.

18. The apparatus of claim 17, wherein the information is received from the UE, and comprises at least one of a type of Wi-Fi packets received by the UE, an interference measurement report for downlink (DL) transmission, and CCA clearance statistics, wherein the at least one CCA parameter is determined at least in part using the information received from the UE.

19. The apparatus of claim 15, wherein the at least one CCA parameter indicated to the UE from the base station indicates at least one of:

a CCA threshold to be used by the UE per slot, wherein different CCA thresholds are indicated for different slots;
a channel access scheme;
a backoff scheme;
the channel access scheme, the indicated channel access scheme being different for each UL channel;
a duration for at least a portion of slots for the CCA procedure, wherein different slots have different durations;
whether to respect a reservation signal type, the reservation signal type being at least one of a Wi-Fi reservation signal, a reservation signal associated with a UE deployment, or a reservation signal associated with another license assisted access deployment;
whether to transmit a Wi-Fi channel usage beacon signal (W-CUBS) when performing the CCA procedure;
whether contention based access is enabled for UL transmission, wherein when the contention based access is enabled, the UE can contend for a channel without an UL grant from the base station; or
whether an uplink CCA Exempt Transmission (UL-CET) is enabled.

20. An apparatus for wireless communication at a base station, comprising:

a memory; and
at least one processor coupled to the memory and configured to:
receive information regarding wireless communication on multiple Radio Access Technologies (RATs) that operate on an unlicensed spectrum;
determine at least one clear channel assessment (CCA) parameter for use by a user equipment (UE) in performing a CCA procedure for uplink (UL) communication comprising communication on the unlicensed spectrum, wherein the at least one CCA parameter is determined based on the received information regarding wireless communication on multiple Radio Access Technologies (RATs) that operate on the unlicensed spectrum; and
transmit an indication of the at least one CCA parameter from the base station to the UE, wherein the at least one CCA parameter is broadcast to multiple UEs through a new downlink control information (DCI) format with a radio network temporary identifier (RNTI) known to a group of UEs.

21. The apparatus of claim 20, wherein receiving the information includes at least one of receiving a report from at least one UE or observing traffic on the multiple RATs.

22. The apparatus of claim 20, wherein the at least one CCA parameter indicated to the UE from the base station indicates at least one of:

a CCA threshold to be used by the UE per slot, wherein different CCA thresholds are indicated for different slots;
a channel access scheme;
a backoff scheme;
the channel access scheme, the indicated channel access scheme being different for each UL channel;
a duration for at least a portion of slots for the CCA procedure, wherein different slots have different durations;
whether to respect a reservation signal type, the reservation signal type being at least one of a Wi-Fi reservation signal, a reservation signal associated with a UE deployment, or a reservation signal associated with another license assisted access deployment;

whether to transmit a Wi-Fi channel usage beacon signal (W-CUBS) when performing the CCA procedure;

whether contention based access is enabled for UL transmission, wherein when the contention based access is enabled, the UE can contend for a channel without an UL grant from the base station; or whether an uplink CCA Exempt Transmission (UL-CET) is enabled.

23. A non-transitory computer-readable medium storing computer executable code for wireless communication at a base station, comprising code to:

receive information regarding wireless communication on multiple Radio Access Technologies (RATs) that operate on an unlicensed spectrum;

determine at least one clear channel assessment (CCA) parameter for use by a user equipment (UE) in performing a CCA procedure for uplink (UL) communication comprising communication on the unlicensed spectrum, wherein the at least one CCA parameter is determined based on the received information regarding wireless communication on multiple Radio Access Technologies (RATs) that operate on the unlicensed spectrum; and transmit an indication of the at least one CCA parameter from the base station to the UE, wherein the at least one CCA parameter is broadcast to multiple UEs through a new downlink control information (DCI) format with a radio network temporary identifier (RNTI) known to a group of UEs.

24. The non-transitory computer-readable medium of claim 23, wherein receiving the information includes at least one of receiving a report from at least one UE or observing traffic on the multiple RATs.

25. The non-transitory computer-readable medium of claim 23, wherein the indication is transmitted to the UE in at least one of an UL grant, a downlink (DL) grant, a radio resource control (RRC) message, or a medium access control (MAC) control element.

26. The non-transitory computer-readable medium of claim 25, wherein the information is received from the UE, and comprises at least one of a type of Wi-Fi packets received by the UE, an interference measurement report for downlink (DL) transmission, and CCA clearance statistics, wherein the at least one CCA parameter is determined at least in part using the information received from the UE.

27. The non-transitory computer-readable medium of claim 23, wherein the at least one CCA parameter indicated to the UE from the base station indicates at least one of:

a CCA threshold to be used by the UE per slot, wherein different CCA thresholds are indicated for different slots;

a channel access scheme;

a backoff scheme;

the channel access scheme, the indicated channel access scheme being different for each UL channel;

a duration for at least a portion of slots for the CCA procedure, wherein different slots have different durations;

whether to respect a reservation signal type, the reservation signal type being at least one of a Wi-Fi reservation signal, a reservation signal associated with a UE deployment, or a reservation signal associated with another license assisted access deployment;

whether to transmit a Wi-Fi channel usage beacon signal (W-CUBS) when performing the CCA procedure;

whether contention based access is enabled for UL transmission, wherein when the contention based access is enabled, the UE can contend for a channel without an UL grant from the base station; or whether an uplink CCA Exempt Transmission (UL-CET) is enabled.

28. A method of wireless communication at a User Equipment (UE) comprising:

transmitting information to a base station regarding wireless communication on multiple Radio Access Technologies (RATs) that operate on an unlicensed spectrum;

receiving an indication of at least one clear channel assessment (CCA) parameter for use in performing a CCA procedure for uplink (UL) transmission comprising communication on the unlicensed spectrum, wherein the at least one CCA parameter is based on the information regarding wireless communication on multiple Radio Access Technologies (RATs) that operate on the unlicensed spectrum that is transmitted to the base station, wherein the indication of the at least one CCA parameter is received in a broadcast through a new downlink control information (DCI) format with a radio network temporary identifier (RNTI) known to a group of UEs;

determining whether to use the at least one CCA parameter in performing the CCA procedure for UL transmission; and performing the CCA procedure.

29. The method of claim 28, wherein performing the CCA procedure includes performing the CCA procedure for UL transmission using the at least one indicated CCA parameter.

30. The method of claim 28, wherein when the UE determines not to use the at least one CCA parameter, the UE performs the CCA procedure using a different parameter than the at least one indicated CCA parameter.

31. The method of claim 28, wherein the UE receives an indication for a plurality of parameters for use in performing the CCA procedure for uplink (UL) transmission, and wherein the UE performs the CCA procedure using only a portion of the plurality of indicated parameters.

32. The method of claim 28, wherein the information comprises at least one of a type of received Wi-Fi packets, an interference measurement report for downlink (DL) transmission, and CCA clearance statistics prior to receiving the indication of the at least one CCA parameter.

33. An apparatus for wireless communication at a User Equipment (UE) comprising:

means for transmitting information to a base station regarding wireless communication on multiple Radio Access Technologies (RATs) that operate on an unlicensed spectrum;

means for receiving an indication of at least one clear channel assessment (CCA) parameter for use in performing a CCA procedure for uplink (UL) transmission comprising communication on the unlicensed spectrum, wherein the at least one CCA parameter is based on the information regarding wireless communication on multiple Radio Access Technologies (RATs) that operate on the unlicensed spectrum that is transmitted to the base station, wherein the indication of the at least one CCA parameter is received in a broadcast through a new downlink control information (DCI) format with a radio network temporary identifier (RNTI) known to a group of UEs;

means for determining whether to use the at least one CCA parameter in performing the CCA procedure for UL transmission; and means for performing the CCA procedure.

34. The apparatus of claim 33, wherein when the means for determining determine not to use the at least one CCA parameter, the means for performing the CCA procedure use a different parameter than the at least one indicated CCA parameter.

35. The apparatus of claim 33, wherein the means for receiving receive an indication for a plurality of parameters for use in performing the CCA procedure for uplink (UL) transmission, and wherein the means for performing the CCA procedure uses only a portion of the plurality of indicated parameters.

36. The apparatus of claim 33, wherein the indication is received in at least one of:
 an UL grant,
 a downlink (DL) grant,
 the broadcast directed to multiple user equipments (UEs),
 a radio resource control (RRC) message, or
 a medium access control (MAC) control element.

37. The apparatus of claim 33, wherein the information comprises at least one of a type of received Wi-Fi packets, an interference measurement report for downlink (DL) transmission, and CCA clearance statistics prior to receiving the indication of the at least one CCA parameter.

38. An apparatus for wireless communication at a User Equipment (UE) comprising:
 a memory; and
 at least one processor coupled to the memory and configured to:
  transmit information to a base station regarding wireless communication on multiple Radio Access Technologies (RATs) that operate on an unlicensed spectrum;
  receive an indication of at least one clear channel assessment (CCA) parameter for use in performing a CCA procedure for uplink (UL) transmission comprising communication on the unlicensed spectrum, wherein the at least one CCA parameter is based on the information regarding wireless communication on multiple Radio Access Technologies (RATs) that operate on the unlicensed spectrum that is transmitted to the base station, wherein the indication of the at least one CCA parameter is received in a broadcast through a new downlink control information (DCI) format with a radio network temporary identifier (RNTI) known to a group of UEs;
  determine whether to use the at least one CCA parameter in performing the CCA procedure for UL transmission; and
  perform the CCA procedure.

39. The apparatus of claim 38, wherein when the UE determines not to use the at least one CCA parameter, the UE performs the CCA procedure using a different parameter than the at least one indicated CCA parameter.

40. The apparatus of claim 38, wherein the UE receives an indication for a plurality of parameters for use in performing the CCA procedure for uplink (UL) transmission, and wherein the UE performs the CCA procedure using only a portion of the plurality of indicated parameters.

41. The apparatus of claim 38, wherein the information comprises at least one of a type of received Wi-Fi packets, an interference measurement report for downlink (DL) transmission, and CCA clearance statistics prior to receiving the indication of the at least one CCA parameter.

42. A non-transitory computer-readable medium storing computer executable code for wireless communication at a user equipment (UE), comprising code to:
 transmit information to a base station regarding wireless communication on multiple Radio Access Technologies (RATs) that operate on an unlicensed spectrum;
 receive an indication of at least one clear channel assessment (CCA) parameter for use in performing a CCA procedure for uplink (UL) transmission comprising communication on the unlicensed spectrum, wherein the at least one CCA parameter is based on the information regarding wireless communication on multiple Radio Access Technologies (RATs) that operate on the unlicensed spectrum that is transmitted to the base station, wherein the indication of the at least one CCA parameter is received in a broadcast through a new downlink control information (DCI) format with a radio network temporary identifier (RNTI) known to a group of UEs;
 determine whether to use the at least one CCA parameter in performing the CCA procedure for UL transmission; and
 perform the CCA procedure.

43. The non-transitory computer-readable medium of claim 42, wherein when the UE determines not to use the at least one CCA parameter, the UE performs the CCA procedure using a different parameter than the at least one indicated CCA parameter.

44. The non-transitory computer-readable medium of claim 42, wherein the UE receives an indication for a plurality of parameters for use in performing the CCA procedure for uplink (UL) transmission, and wherein the UE performs the CCA procedure using only a portion of the plurality of indicated parameters.

45. The non-transitory computer-readable medium of claim 42, wherein the indication is received in at least one of
 an UL grant,
 a downlink (DL) grant,
 the broadcast directed to multiple user equipments (UEs),
 a radio resource control (RRC) message, or
 a medium access control (MAC) control element.

46. The non-transitory computer-readable medium of claim 42, wherein the information comprises at least one of a type of received Wi-Fi packets, an interference measurement report for downlink (DL) transmission, and CCA clearance statistics prior to receiving the indication of the at least one CCA parameter.

47. An apparatus for wireless communication at a base station, comprising:
 a memory; and
 at least one processor coupled to the memory and configured to:
  receive information regarding wireless communication on multiple Radio Access Technologies (RATs) that operate on an unlicensed spectrum;
  determine at least one clear channel assessment (CCA) parameter for use by a user equipment (UE) in performing a CCA procedure for uplink (UL) communication comprising communication on the unlicensed spectrum, wherein the at least one CCA parameter is determined based on the received information regarding wireless communication on multiple Radio Access Technologies (RATs) that operate on the unlicensed spectrum; and transmit an indication of the at least one CCA parameter from the base station to the UE, wherein the at least one CCA parameter comprises an indication of whether to transmit a Wi-Fi channel usage beacon signal (W-CUBS) when performing the CCA procedure.

48. The apparatus of claim 47, wherein the indication is transmitted to the UE in at least one of
an UL grant,
a downlink (DL) grant,
a radio resource control (RRC) message, or
a medium access control (MAC) control element.

49. The apparatus of claim 48, wherein the information is received from the UE, and comprises at least one of a type of Wi-Fi packets received by the UE, an interference measurement report for downlink (DL) transmission, and CCA clearance statistics,
wherein the at least one CCA parameter is determined at least in part using the information received from the UE.

50. An apparatus for wireless communication at a base station, comprising:
a memory; and
at least one processor coupled to the memory and configured to:
receive information regarding wireless communication on multiple Radio Access Technologies (RATs) that operate on an unlicensed spectrum;
determine at least one clear channel assessment (CCA) parameter for use by a user equipment (UE) in performing a CCA procedure for uplink (UL) communication comprising communication on the unlicensed spectrum, wherein the at least one CCA parameter is determined based on the received information regarding wireless communication on multiple Radio Access Technologies (RATs) that operate on the unlicensed spectrum; and
transmit an indication of the at least one CCA parameter from the base station to the UE, wherein the at least one CCA parameter indicates whether contention based access is enabled for UL transmission, wherein when the at least one CCA parameter indicates that the contention based access is enabled, the UE can contend for a channel without an UL grant from the base station, and wherein when the at least one CCA parameter indicates that the contention based access is not enabled, the UE waits for the UL grant from the base station to contend for the channel.

51. A method of wireless communication at a User Equipment (UE) comprising:
transmitting information to a base station regarding wireless communication on multiple Radio Access Technologies (RATs) that operate on an unlicensed spectrum;
receiving an indication of at least one clear channel assessment (CCA) parameter for use in performing a CCA procedure for uplink (UL) transmission comprising communication on the unlicensed spectrum, wherein the at least one CCA parameter is based on the information regarding wireless communication on multiple Radio Access Technologies (RATs) that operate on the unlicensed spectrum that is transmitted to the base station, wherein the at least one CCA parameter indicates whether to transmit a Wi-Fi channel usage beacon signal (W-CUBS) when performing the CCA procedure;
determining whether to use the at least one CCA parameter in performing the CCA procedure for UL transmission; and
performing the CCA procedure.

52. The method of claim 51, wherein the indication is received in at least one of
an UL grant,
a downlink (DL) grant,
a broadcast directed to multiple user equipments (UEs),
a radio resource control (RRC) message, or
a medium access control (MAC) control element.

53. A method of wireless communication at a User Equipment (UE) comprising:
transmitting information to a base station regarding wireless communication on multiple Radio Access Technologies (RATs) that operate on an unlicensed spectrum;
receiving an indication of at least one clear channel assessment (CCA) parameter for use in performing a CCA procedure for uplink (UL) transmission comprising communication on the unlicensed spectrum, wherein the at least one CCA parameter is based on the information regarding wireless communication on multiple Radio Access Technologies (RATs) that operate on the unlicensed spectrum that is transmitted to the base station, wherein the at least one CCA parameter indicates whether contention based access is enabled for the UL transmission, wherein when the at least one CCA parameter indicates that the contention based access is enabled, the UE can contend for a channel without an UL grant from the base station, and wherein when the at least one CCA parameter indicates that the contention based access is not enabled, the UE waits for the UL grant from the base station to contend for the channel;
determining whether to use the at least one CCA parameter in performing the CCA procedure for UL transmission; and
performing the CCA procedure.

54. An apparatus for wireless communication at a User Equipment (UE), comprising:
a memory; and
at least one processor coupled to the memory and configured to:
transmit information to a base station regarding wireless communication on multiple Radio Access Technologies (RATs) that operate on an unlicensed spectrum;
receive an indication of at least one clear channel assessment (CCA) parameter for use in performing a CCA procedure for uplink (UL) transmission comprising communication on the unlicensed spectrum, wherein the at least one CCA parameter is based on the information regarding wireless communication on multiple Radio Access Technologies (RATs) that operate on the unlicensed spectrum that is transmitted to the base station, wherein the at least one CCA parameter indicates whether to transmit a Wi-Fi channel usage beacon signal (W-CUBS) when performing the CCA procedure;
determine whether to use the at least one CCA parameter in performing the CCA procedure for UL transmission; and
perform the CCA procedure.

55. The apparatus of claim 54, wherein the indication is received in at least one of
- an UL grant,
- a downlink (DL) grant,
- a broadcast directed to multiple user equipments (UEs),
- a radio resource control (RRC) message, or
- a medium access control (MAC) control element.

56. An apparatus for wireless communication at a User Equipment (UE), comprising:
- a memory; and
- at least one processor coupled to the memory and configured to:
  - transmit information to a base station regarding wireless communication on multiple Radio Access Technologies (RATs) that operate on an unlicensed spectrum;
  - receive an indication of at least one clear channel assessment (CCA) parameter for use in performing a CCA procedure for uplink (UL) transmission comprising communication on the unlicensed spectrum, wherein the at least one CCA parameter is based on the information regarding wireless communication on multiple Radio Access Technologies (RATs) that operate on the unlicensed spectrum that is transmitted to the base station, wherein the at least one CCA parameter indicates whether contention based access is enabled for the UL transmission, wherein when the at least one CCA parameter indicates that the contention based access is enabled, the UE can contend for a channel without an UL grant from the base station, and wherein when the at least one CCA parameter indicates that the contention based access is not enabled, the UE waits for the UL grant from the base station to contend for the channel;
  - determine whether to use the at least one CCA parameter in performing the CCA procedure for UL transmission; and
  - perform the CCA procedure.

* * * * *